United States Patent
Chen et al.

(10) Patent No.: US 8,922,914 B2
(45) Date of Patent: Dec. 30, 2014

(54) IMAGE CAPTURING LENS SYSTEM

(71) Applicant: Largan Precision Co., Ltd., Taichung (TW)

(72) Inventors: Chun-Shan Chen, Taichung (TW); Dung-Yi Hsieh, Taichung (TW); Lin-Yao Liao, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 41 days.

(21) Appl. No.: 13/763,077

(22) Filed: Feb. 8, 2013

(65) Prior Publication Data

US 2014/0185151 A1    Jul. 3, 2014

(30) Foreign Application Priority Data

Dec. 28, 2012   (TW) ............................. 101151214 A

(51) Int. Cl.
  *G02B 9/34*    (2006.01)
  *G02B 13/18*   (2006.01)
  *G02B 13/00*   (2006.01)

(52) U.S. Cl.
  CPC ...... *G02B 9/34* (2013.01); *G02B 13/18* (2013.01); *G02B 13/004* (2013.01)
  USPC ......................................... 359/773; 359/715

(58) Field of Classification Search
  CPC .............. G02B 9/00; G02B 9/34; G02B 9/60; G02B 9/62; G02B 9/64; G02B 13/18
  USPC .................................................. 359/771–773
  See application file for complete search history.

(56) References Cited

U.S. PATENT DOCUMENTS

| | | | |
|---|---|---|---|
| 7,145,736 B2 | 12/2006 | Noda | |
| 8,314,999 B1 | 11/2012 | Tsai | |
| 8,508,863 B2 * | 8/2013 | Tang et al. | 359/715 |
| 8,804,252 B2 * | 8/2014 | Hsieh et al. | 359/715 |
| 2012/0281299 A1 * | 11/2012 | Hsu et al. | 359/715 |

* cited by examiner

*Primary Examiner* — Darryl J Collins
(74) *Attorney, Agent, or Firm* — Morris Manning & Martin LLP; Tim Tingkang Xia, Esq.

(57) ABSTRACT

An image capturing lens system includes four lens elements with refractive power, in order from an object side to an image side, a first lens element, a second lens element, a third lens element and a fourth lens element. The positive first lens element has a convex object-side surface at a paraxial region. The negative second lens element has a concave object-side surface at a paraxial region and an image-side surface changing from concave at a paraxial region to convex at a peripheral region, wherein the surfaces of the second lens element are aspheric. The positive third lens element has a concave object-side surface at a paraxial region and a convex image-side surface at a paraxial region. The negative fourth lens element has an image-side surface changing from concave at a paraxial region to convex at a peripheral region, and the surfaces of the fourth lens element are aspheric.

19 Claims, 19 Drawing Sheets

IMAGE CAPTURING LENS SYSTEM

RELATED APPLICATIONS

The application claims priority to Taiwan Application Serial Number 101151214, filed Dec. 28, 2012, which is herein incorporated by reference.

BACKGROUND

1. Technical Field

The present invention relates to an image capturing lens system. More particularly, the present invention relates to a compact image capturing lens system applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system in a portable electronic product mainly adopts a structure of three-element lens such as the one disclosed in U.S. Pat. No. 7,145,736. Due to the popularity of mobile products with high-end specifications, such as smart phones and PDAs (Personal Digital Assistants), the requirements for high resolution and better image quality of modern compact optical lens systems has been increasing significantly. However, the conventional three-element lens structure cannot satisfy these requirements of the compact optical lens system.

Although other conventional optical lens systems with four-element lens structure such as the one disclosed in U.S. Pat. No. 8,314,999. Although better image quality is obtained, the total track length of the optical lens system is thereby too long to maintain a compact size. Moreover, the design of the image-side surface of the second lens element makes the image quality of the peripheral region hard to control.

SUMMARY

According to one aspect of the present disclosure, an image capturing lens system includes four lens elements with refractive power, in order from an object side to an image side, a first lens element, a second lens element, a third lens element and a fourth lens element. The first lens element with positive refractive power has a convex object-side surface at a paraxial region. The second lens element with negative refractive power has a concave object-side surface at a paraxial region and a concave image-side surface at a paraxial region, wherein the image-side surface of the second lens element changes from concave at the paraxial region to convex at a peripheral region, and both the object-side surface and the image-side surface of the second lens element are aspheric. The third lens element with positive refractive power has a concave object-side surface at a paraxial region and a convex image-side surface at a paraxial region thereof. The fourth lens element with negative refractive power has a concave image-side surface at a paraxial region, wherein the image-side surface of the fourth lens element changes from concave at the paraxial region to convex at a peripheral region, and an object-side surface and the image-side surface of the fourth lens element are aspheric. When a displacement in parallel with an optical axis from an axial vertex on the image-side surface of the second lens element to a maximum effective diameter position on the image-side surface of the second lens element is Sag22, a central thickness of the second lens element is CT2, an axial distance between the first lens element and the second lens element is T12, a focal length of the first lens element is f1, and a focal length of the third lens element is f3, the following relationships are satisfied:

$-5.0<(Sag22/CT2)\times 10<0; 0.30<T12/CT2<0.81;$ and $1.65<f1/f3<4.0.$

According to another aspect of the present disclosure, an image capturing lens system includes four lens elements with refractive power, in order from an object side to an image side, a first lens element, a second lens element, a third lens element and a fourth lens element. The first lens element with positive refractive power has a convex object-side surface at a paraxial region. The second lens element with negative refractive power has a concave object-side surface at a paraxial region and a concave image-side surface at a paraxial region, wherein the image-side surface of the second lens element changes from concave at the paraxial region to convex at a peripheral region, and both the object-side surface and the image-side surface of the second lens element are aspheric. The third lens element with positive refractive power has a concave object-side surface at a paraxial region and a convex image-side surface at a paraxial region. The fourth lens element with negative refractive power has a concave image-side surface at a paraxial region, wherein the image-side surface of the fourth lens element changes from concave at the paraxial region to convex at a peripheral region, and an object-side surface and the image-side surface of the fourth lens element are aspheric. When a displacement in parallel with an optical axis from an axial vertex on the image-side surface of the second lens element to a maximum effective diameter position on the image-side surface of the second lens element is Sag22, a central thickness of the second lens element is CT2, an axial distance between the first lens element and the second lens element is T12, and an axial distance between the second lens element and the third lens element is T23, the following relationships are satisfied:

$-5.0<(Sag22/CT2)\times 10<0;$ $0.30<T12/CT2<0.81;$ and $0.10<T23/CT2<0.90.$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
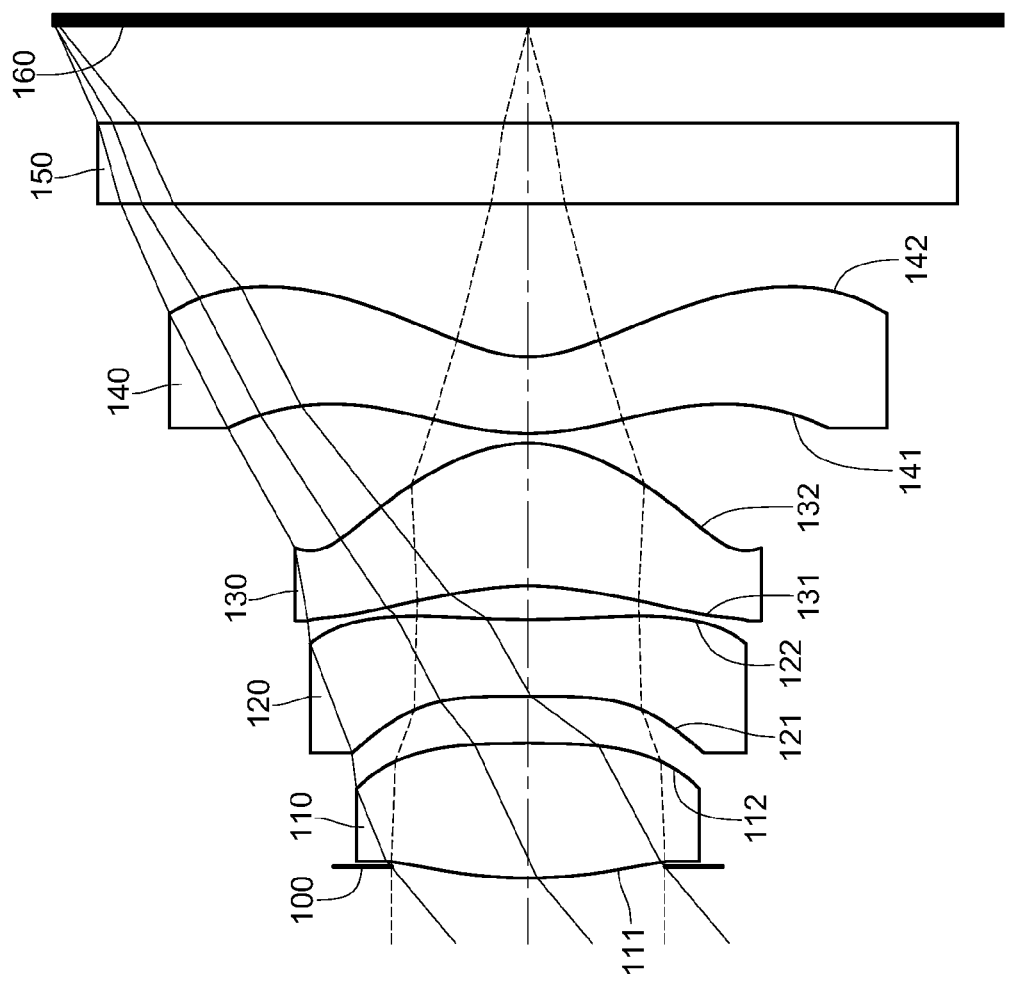
FIG. 1 is a schematic view of an image capturing lens system according to the 1st embodiment of the present disclosure.

An image capturing lens system includes four lens elements with refractive power, in order from an object side to an image side, a first lens element, a second lens element, a third lens element and a fourth lens element.

The first lens element with positive refractive power has a convex object-side surface at a paraxial region, so that it provides the image capturing lens system with the positive refractive power as it needs to be. Moreover, it is favorable for further reducing the total track length of the image capturing lens system.

The second lens element has negative refractive power, so that it is favorable for correcting the aberration of the first lens element. The second lens element has a concave object-side surface at a paraxial region and a concave image-side surface at a paraxial region, so that it is favorable for correcting the astigmatism of the image capturing lens system. Moreover, the image-side surface of the second lens element changes from concave at the paraxial region to convex at a peripheral region, so that it is favorable for reducing a sum of all of axial distances between adjacent lens elements, reducing aberrations caused by short total track length of the image capturing lens system, and improving poor focus.

The third lens element has positive refractive power, so that the sensitivity of the image capturing lens system can be reduced. The third lens element has a concave object-side surface at a paraxial region and a convex image-side surface at a paraxial region, so that the astigmatism of the image capturing lens system can be further corrected.

The fourth lens element has negative refractive power, so that it is favorable for reducing the back focal length of the image capturing lens system so as to reduce the total track length of the image capturing lens system. The fourth lens element can have a concave object-side surface and a concave image-side surface at a paraxial region, and the image-side surface of the fourth lens element changes from concave at the paraxial region to convex at a peripheral region. Therefore, it is favorable for correcting the aberration of the image capturing lens system and effectively reducing the angle at which the incident light projects onto an image sensor from the off-axis field.

When a displacement in parallel with an optical axis from an axial vertex on the image-side surface of the second lens element to a maximum effective diameter position on the image-side surface of the second lens element is Sag22 (When the distance in parallel with the optical axis towards the object side of the image capturing lens system is negative; while the distance in parallel with the optical axis towards the image side of the image capturing lens system is positive.), and a central thickness of the second lens element is CT2, the following relationship is satisfied: $-5.0<(Sag22/CT2)\times 10<0$. Therefore, it is favorable for reducing a sum of all of axial distances between adjacent lens elements, reducing aberrations caused by short total track length of the image capturing lens system, and improving poor focus. Preferably, the following relationship is satisfied: $-3.5<(Sag22/CT2)\times 10<-0.25$.

When an axial distance between the first lens element and the second lens element is T12, and the central thickness of the second lens element is CT2, the following relationship is satisfied: $0.30<T12/CT2<0.81$. Therefore, it provides favorable moldability and homogeneity for plastic lens elements during the injection molding process so as to increase the manufacturing yield rate. Preferably, the following relationship is satisfied: $0.40<T12/CT2<0.76$.

When a focal length of the first lens element is f1, and a focal length of the third lens element is f3, the following relationship is satisfied: $1.65<f1/f3<4.0$. Therefore, it is favorable for effectively distributing the positive refractive power of the first lens element and the third lens element so as to reduce the sensitivity of the image capturing lens system. Preferably, the following relationship is satisfied: $1.75<f1/f3<3.2$.

When the central thickness of the second lens element is CT2, and an axial distance between the second lens element and the third lens element is T23, the following relationship is satisfied: $0.10<T23/CT2<0.90$. Therefore, the axial distances between lens elements and the central thickness of every lens element are proper which is favorable for assembling the lens elements so as to keep the image capturing lens system compact.

When a focal length of the image capturing lens system is f, the focal length of the third lens element is f3, and a focal length of the fourth lens element is f4, the following relationship is satisfied: $2.5<|f/f3|+|f/f4|<7.5$. Therefore, it is favorable for balancing the arrangement of the refractive power so as to reduce the sensitivity of the image capturing lens system and to reduce aberration. Preferably, the following relationship is satisfied: $3.0 < |f/f3| + |f/f4| < 6.0$.

When a sum of a central thickness of the first lens element, the central thickness of the second lens element, a central thickness of the third lens element and a central thickness of the fourth lens element is $\Sigma CT$, and an axial distance between the object-side surface of the first lens element and the image-side surface of the fourth lens element is Td, the following relationship is satisfied: $0.75 < \Sigma CT/Td < 0.95$. Therefore, it is favorable for reducing the total track length of the image capturing lens system so as to keep a compact size. Preferably, the following relationship is satisfied: $0.75 < \Sigma CT/Td < 0.90$.

When a displacement in parallel with an optical axis from an axial vertex on the object-side surface of the second lens element to a maximum effective diameter position on the object-side surface of the second lens element is Sag21 (When the distance in parallel with the optical axis towards the object side of the image capturing lens system is negative; while the distance in parallel with the optical axis towards the image side of the image capturing lens system is positive.), and the central thickness of the second lens element is CT2, the following relationship is satisfied: $-0.85 < Sag21/CT2 < -0.40$. Therefore, the second lens element is not be excessively curved and with proper thickness favorable for manufacturing and assembling so as to increase the manufacturing yield rate.

When a curvature radius of the object-side surface of the second lens element is R3, and a curvature radius of the image-side surface of the second lens element is R4, the following relationship is satisfied: $-0.75 < (R3+R4)/(R3-R4) < 0.5$. Therefore, it is favorable for further correcting the aberration. Preferably, the following relationship is satisfied: $-0.5 < (R3+R4)/(R3-R4) < 0.5$.

When the axial distance between the first lens element and the second lens element is T12, and the axial distance between the second lens element and the third lens element is T23, the following relationship is satisfied: $0.9 < T12/T23 < 2.5$. Therefore, it is favorable for assembling the image capturing lens system so as to increase the manufacturing yield rate.

When the axial distance between the object-side surface of the first lens element and the image-side surface of the fourth lens element is Td, the following relationship is satisfied: $1.0 \text{ mm} < Td < 2.35 \text{ mm}$. Therefore, it is favorable for keeping the image capturing lens system compact so as to be applied to the electronic products.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an image capturing lens system. Therefore, the total track length of the image capturing lens system can also be reduced.

According to the image capturing lens system of the present disclosure, there can be at least one stop provided, such as an aperture stop, a glare stop or a field stop. Said glare stop or said field stop is for eliminating the stray light and thereby improving resolution thereof.

According to the image capturing lens system of the present disclosure, an aperture stop can be configured as a front stop or a middle stop. A front stop can provide a longer distance between an exit pupil of the system and an image plane and which improves the image-sensing efficiency of an image sensor. A middle stop is favorable for enlarging the field of view of the system and thereby provides a wider field of view for the same.

According to the image capturing lens system of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at a paraxial region and when the lens element has a concave surface, it indicates that the surface is concave at a paraxial region.

According to the image capturing lens system of the present disclosure, the image capturing lens system is featured with good correction ability and high image quality, and can be applied to 3D (three-dimensional) image capturing applications, in products such as digital cameras, mobile devices and tablets.

According to the above description of the present disclosure, the following 1st-9th specific embodiments are provided for further explanation.

1st Embodiment

Figure 2:
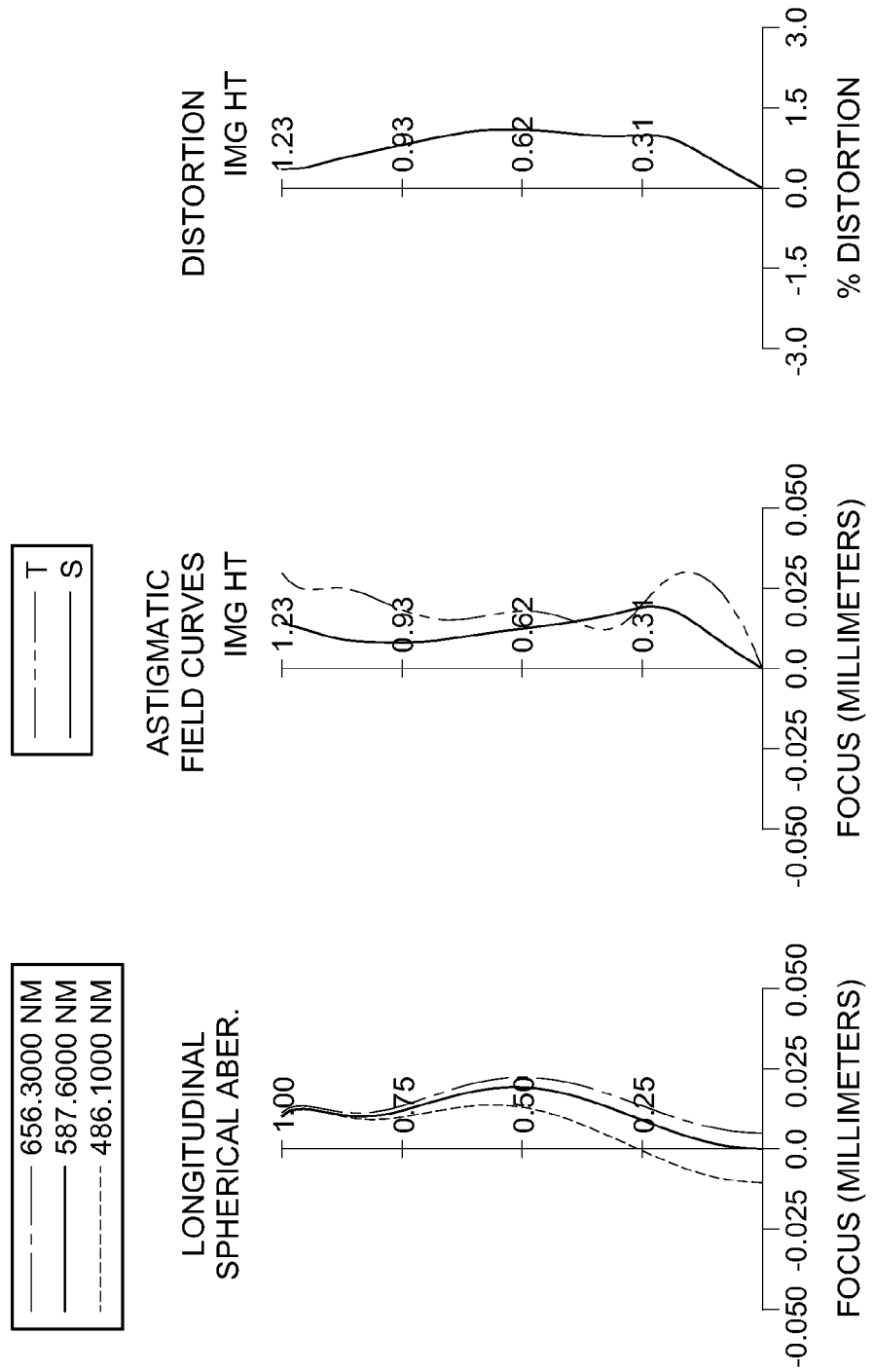
FIG. 2 shows spherical aberration curves, astigmatic field curves and a distortion curve of the image capturing lens system according to the 1st embodiment.

FIG. 1 is a schematic view of an image capturing lens system according to the 1st embodiment of the present disclosure. FIG. 2 shows spherical aberration curves, astigmatic field curves and a distortion curve of the image capturing lens system according to the 1st embodiment. In FIG. 1, the image capturing lens system includes, in order from an object side to an image side, an aperture stop 100, the first lens element 110, the second lens element 120, the third lens element 130, the fourth lens element 140, an IR-cut filter 150, and an image plane 160. There are four lens elements with refractive power.

The first lens element 110 with positive refractive power has a convex object-side surface 111 at a paraxial region and a convex image-side surface 112 at a paraxial region, and is made of plastic material. The object-side surface 111 and the image-side surface 112 of the first lens element 110 are aspheric.

The second lens element 120 with negative refractive power has a concave object-side surface 121 at a paraxial region and a concave image-side surface 122 at a paraxial region, wherein the image-side surface 122 of the second lens element 120 which is made of plastic material changes from concave at the paraxial region to convex at a peripheral region. The object-side surface 121 and the image-side surface 122 of the second lens element 120 are aspheric.

The third lens element 130 with positive refractive power has a concave object-side surface 131 at a paraxial region and a convex image-side surface 132 at a paraxial region, and is made of plastic material. The object-side surface 131 and the image-side surface 132 of the third lens element 130 are aspheric.

The fourth lens element 140 with negative refractive power has a convex object-side surface 141 at a paraxial region and a concave image-side surface 142 at a paraxial region, wherein the image-side surface 142 of the fourth lens element 140 which is made of plastic material changes from concave at the paraxial region to convex at a peripheral region. The object-side surface 141 and the image-side surface 142 of the fourth lens element 140 are aspheric.

The IR-cut filter 150 is made of glass and located between the fourth lens element 140 and the image plane 160, and does not affect the focal length of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance between a point on the aspheric surface at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image capturing lens system according to the 1st embodiment, when a focal length of the image capturing lens system is f, an f-number of the image capturing lens system is Fno, and a half of the maximal field of view is HFOV, these parameters have the following values:

f=1.45 mm;

Fno=2.04; and

HFOV=40.0 degrees.

In the image capturing lens system according to the 1st embodiment, when an axial distance between the first lens element 110 and the second lens element 120 is T12, and a central thickness of the second lens element 120 is CT2, the following relationship is satisfied: T12/CT2=0.615.

In the image capturing lens system according to the 1st embodiment, when an axial distance between the second lens element 120 and the third lens element 130 is T23, and the central thickness of the second lens element 120 is CT2, the following relationship is satisfied: T23/CT2=0.435.

In the image capturing lens system according to the 1st embodiment, when the axial distance between the first lens element 110 and the second lens element 120 is T12, and the axial distance between the second lens element 120 and the third lens element 130 is T23, the following relationship is satisfied: T12/T23=1.414.

In the image capturing lens system according to the 1st embodiment, when an axial distance between the object-side surface 111 of the first lens element 110 and the image-side surface 142 of the fourth lens element 140 is Td, the following relationship is satisfied: Td=1.360 mm.

In the image capturing lens system according to the 1st embodiment, when a sum of a central thickness of the first lens element 110, the central thickness of the second lens element 120, a central thickness of the third lens element 130 and a central thickness of the fourth lens element 140 is ΣCT, and the axial distance between the object-side surface 111 of the first lens element 110 and the image-side surface 142 of the fourth lens element 140 is Td, the following relationship is satisfied: ΣCT/Td=0.827.

Figure 19:
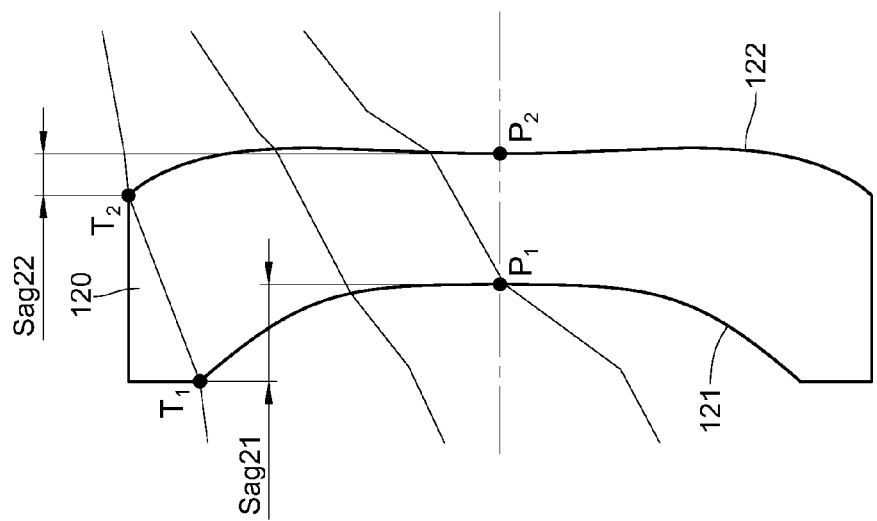
FIG. 19 shows Sag21 and Sag22 of the image capturing lens system according to the 1st embodiment.

Please refer to FIG. 19, in the image capturing lens system according to the 1st embodiment, when a displacement in parallel with an optical axis from an axial vertex P2 on the image-side surface 122 of the second lens element 120 to a maximum effective diameter position T2 on the image-side surface 122 of the second lens element 120 is Sag22 (When the displacement in parallel with the optical axis towards the object side of the image capturing lens system is negative; while the displacement in parallel with the optical axis towards the image side of the image capturing lens system is positive.), and the central thickness of the second lens element 120 is CT2, the following relationship is satisfied: (Sag22/CT2)×10=−3.192

Please refer to FIG. 19, in the image capturing lens system according to the 1st embodiment, when a displacement in parallel with an optical axis from an axial vertex P1 on the object-side surface 121 of the second lens element 120 to a maximum effective diameter position T1 on the object-side surface 121 of the second lens element 120 is Sag21 (When the displacement in parallel with the optical axis towards the object side of the image capturing lens system is negative; while the displacement in parallel with the optical axis towards the image side of the image capturing lens system is positive.), and the central thickness of the second lens element 120 is CT2, the following relationship is satisfied: Sag21/CT2=−0.742

In the image capturing lens system according to the 1st embodiment, when a curvature radius of the object-side surface 121 of the second lens element 120 is R3, and a curvature radius of the image-side surface 122 of the second lens element 120 is R4, the following relationship is satisfied: (R3+R4)/(R3−R4)=0.40.

In the image capturing lens system according to the 1st embodiment, when a focal length of the first lens element 110 is f1, and a focal length of the third lens element 130 is f3, the following relationship is satisfied: f1/f3=1.826.

In the image capturing lens system according to the 1st embodiment, when the focal length of the image capturing lens system is f, the focal length of the third lens element 130 is f3, and a focal length of the fourth lens element 140 is f4, the following relationship is satisfied: |f/f3|+|f/f4|=2.622.

The detailed optical data of the 1st embodiment are shown in Table 1 and the aspheric surface data are shown in Table 2 below.

TABLE 1

1st Embodiment
f = 1.45 mm, Fno = 2.04, HFOV = 40.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.029 | | | | |
| 2 | Lens 1 | 1.199 | ASP | 0.352 | Plastic | 1.544 | 55.9 | 1.70 |
| 3 | | −3.621 | ASP | 0.123 | | | | |
| 4 | Lens 2 | −6.810 | ASP | 0.200 | Plastic | 1.640 | 23.3 | −3.15 |
| 5 | | 2.899 | ASP | 0.087 | | | | |

TABLE 1-continued

1st Embodiment
f = 1.45 mm, Fno = 2.04, HFOV = 40.0 deg.

| Surface # | | Curvature Radius | | Thickness | Material | Index | Abbe # | Focal length |
|---|---|---|---|---|---|---|---|---|
| 6 | Lens 3 | −0.800 | ASP | 0.373 | Plastic | 1.544 | 55.9 | 0.93 |
| 7 | | −0.361 | ASP | 0.025 | | | | |
| 8 | Lens 4 | 0.666 | ASP | 0.200 | Plastic | 1.544 | 55.9 | −1.37 |
| 9 | | 0.315 | ASP | 0.400 | | | | |
| 10 | IR-cut filter | Plano | | 0.210 | Glass | 1.517 | 64.2 | — |
| 11 | | Plano | | 0.254 | | | | |
| 12 | Image | Plano | | — | | | | |

Note:
Reference wavelength (d-line) is 587.6 nm.

TABLE 2

Aspheric Coefficients

| Surface # | 2 | 3 | 4 | 5 |
|---|---|---|---|---|
| k = | −1.8590E+00 | 5.5692E+01 | 1.6995E+01 | −4.4300E+01 |
| A4 = | −1.6876E−01 | −1.8480E+00 | −3.2421E+00 | −5.3216E−02 |
| A6 = | −3.1097E+00 | −2.2105E+00 | −1.2154E+01 | −1.0599E+01 |
| A8 = | 1.5953E+01 | 1.4446E+01 | 6.9511E+01 | 5.1286E+01 |
| A10 = | −1.3186E+02 | −3.3285E+01 | 6.3727E+01 | −1.0342E+02 |
| A12 = | — | — | −4.4086E+02 | 5.4141E+01 |

| Surface # | 6 | 7 | 8 | 9 |
|---|---|---|---|---|
| k = | 6.8903E−01 | −3.9294E+00 | −2.8750E+00 | −4.2314E+00 |
| A4 = | 3.1014E+00 | −2.7570E+00 | −2.1465E+00 | −7.7737E−01 |
| A6 = | −3.1879E+00 | 1.0550E+01 | 7.9566E+00 | 7.3126E−01 |
| A8 = | −1.2125E+02 | 1.1309E+01 | −3.4378E+01 | −3.5669E−01 |
| A10 = | 1.0565E+03 | −4.4497E+02 | 1.0607E+02 | 2.5075E−01 |
| A12 = | −3.6610E+03 | 2.2991E+03 | −1.9155E+02 | −7.3466E−01 |
| A14 = | 6.0601E+03 | −4.4517E+03 | 1.8003E+02 | 5.7981E−01 |
| A16 = | −3.9956E+03 | 2.9152E+03 | −6.7630E+01 | −9.2855E−02 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
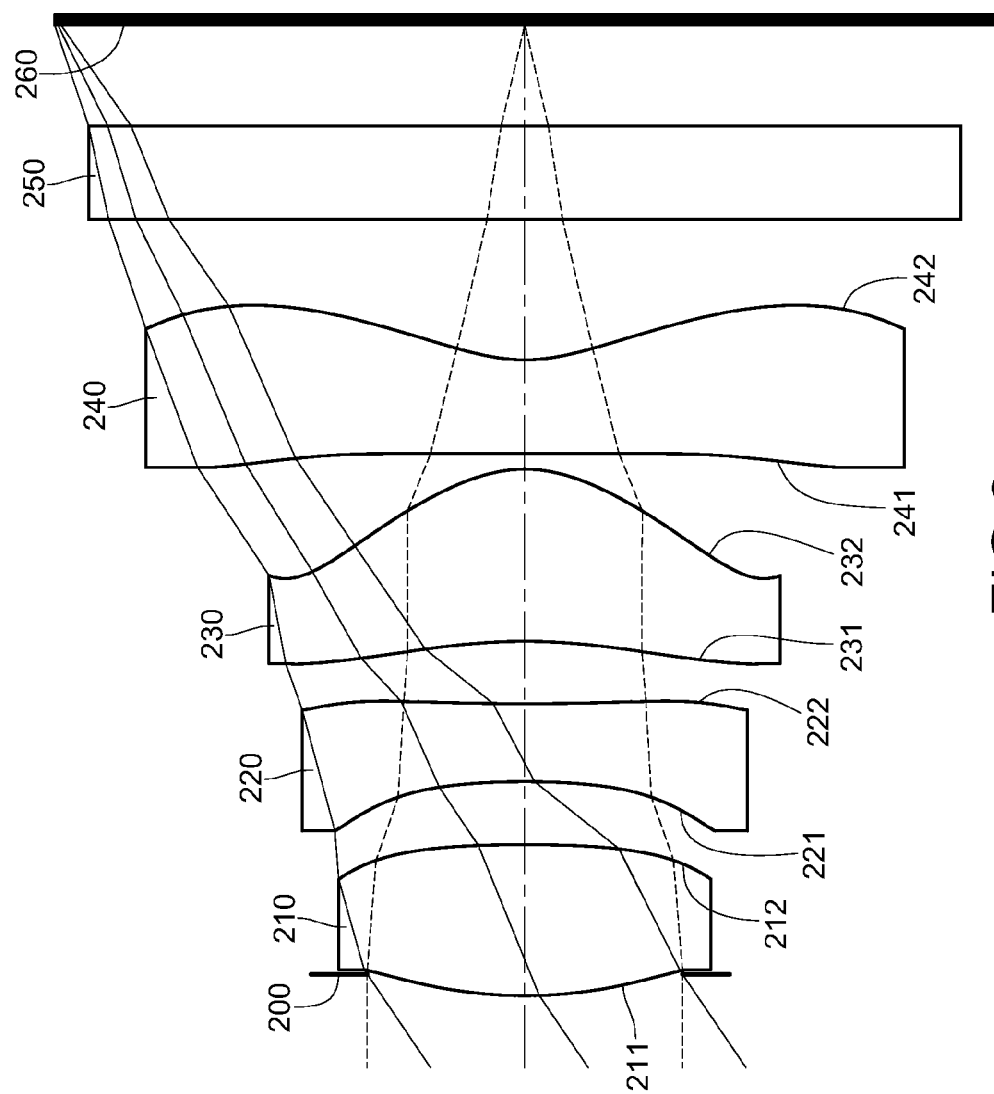
FIG. 3 is a schematic view of an image capturing lens system according to the 2nd embodiment of the present disclosure.
Figure 4:
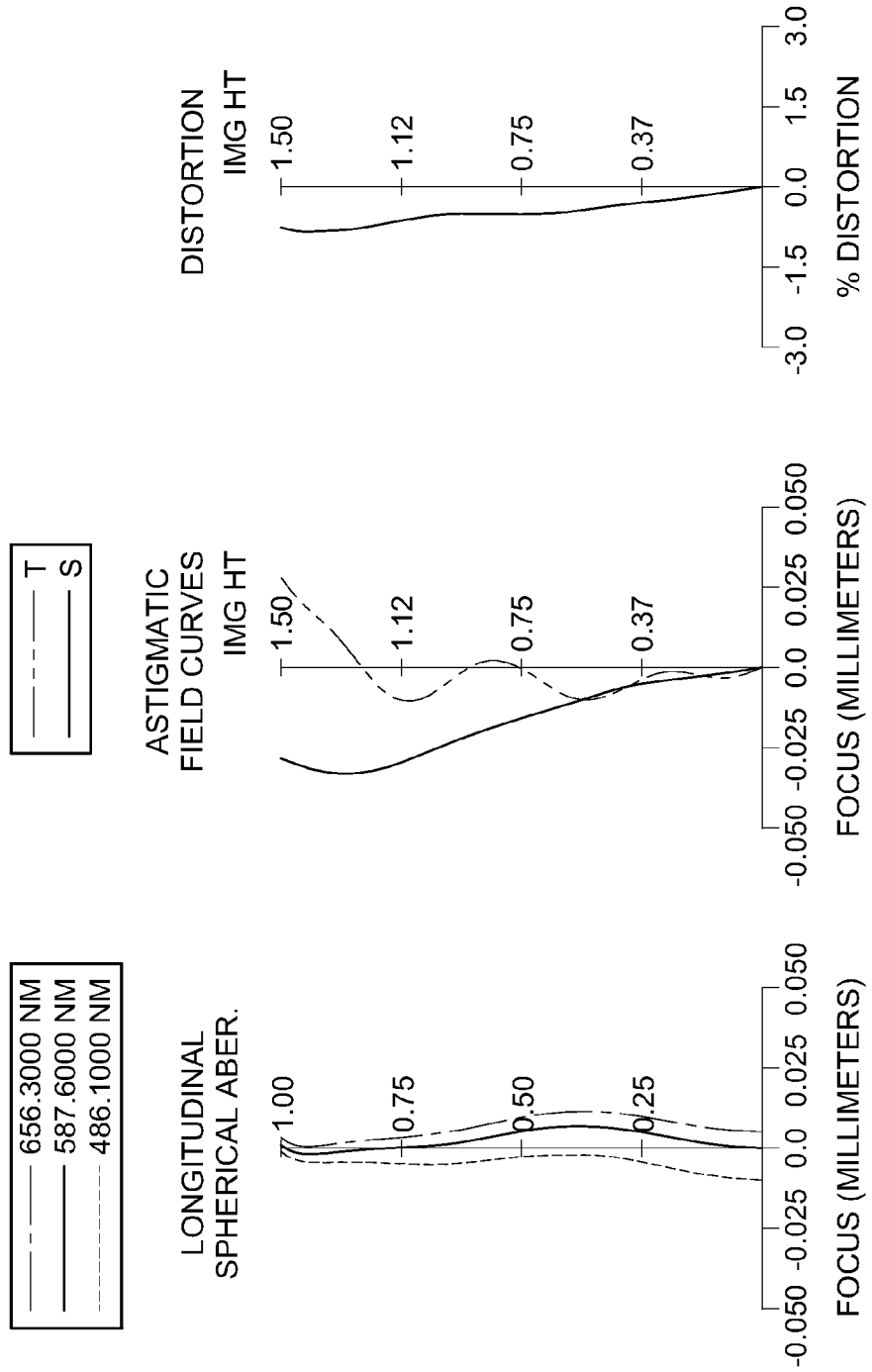
FIG. 4 shows spherical aberration curves, astigmatic field curves and a distortion curve of the image capturing lens system according to the 2nd embodiment.

FIG. 3 is a schematic view of an image capturing lens system according to the 2nd embodiment of the present disclosure. FIG. 4 shows spherical aberration curves, astigmatic field curves and a distortion curve of the image capturing lens system according to the 2nd embodiment. In FIG. 3, the image capturing lens system includes, in order from an object side to an image side, an aperture stop 200, the first lens element 210, the second lens element 220, the third lens element 230, the fourth lens element 240, an IR-cut filter 250, and an image plane 260. There are four lens elements with refractive power.

The first lens element 210 with positive refractive power has a convex object-side surface 211 at a paraxial region and a convex image-side surface 212 at a paraxial region, and is made of plastic material. The object-side surface 211 and the image-side surface 212 of the first lens element 210 are aspheric.

The second lens element 220 with negative refractive power has a concave object-side surface 221 at a paraxial region and a concave image-side surface 222 at a paraxial region, wherein the image-side surface 222 of the second lens element 220 which is made of plastic material changes from concave at the paraxial region to convex at a peripheral region. The object-side surface 221 and the image-side surface 222 of the second lens element 220 are aspheric.

The third lens element 230 with positive refractive power has a concave object-side surface 231 at a paraxial region and a convex image-side surface 232 at a paraxial region, and is made of plastic material. The object-side surface 231 and the image-side surface 232 of the third lens element 230 are aspheric.

The fourth lens element 240 with negative refractive power has a concave object-side surface 241 at a paraxial region and a concave image-side surface 242 at a paraxial region, wherein the image-side surface 242 of the fourth lens element 240 which is made of plastic material changes from concave at the paraxial region to convex at a peripheral region. The object-side surface 241 and the image-side surface 242 of the fourth lens element 240 thereof are aspheric.

The IR-cut filter 250 is made of glass and located between the fourth lens element 240 and the image plane 260, and does not affect the focal length of the image capturing lens system.

The detailed optical data of the 2nd embodiment are shown in Table 3 and the aspheric surface data are shown in Table 4 below.

TABLE 3

2nd Embodiment
f = 2.22 mm, Fno = 2.20, HFOV = 34.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.069 | | | | |
| 2 | Lens 1 | 1.407 | ASP | 0.485 | Plastic | 1.544 | 55.9 | 1.98 |

TABLE 3-continued

2nd Embodiment
f = 2.22 mm, Fno = 2.20, HFOV = 34.1 deg.

| Surface # | | Curvature Radius | | Thickness | Material | Index | Abbe # | Focal length |
|---|---|---|---|---|---|---|---|---|
| 3 | | −4.064 | ASP | 0.202 | | | | |
| 4 | Lens 2 | −2.389 | ASP | 0.250 | Plastic | 1.634 | 23.8 | −3.03 |
| 5 | | 10.244 | ASP | 0.200 | | | | |
| 6 | Lens 3 | −1.879 | ASP | 0.553 | Plastic | 1.544 | 55.9 | 0.87 |
| 7 | | −0.418 | ASP | 0.050 | | | | |
| 8 | Lens 4 | −100.000 | ASP | 0.300 | Plastic | 1.544 | 55.9 | −0.94 |
| 9 | | 0.513 | ASP | 0.450 | | | | |
| 10 | IR-cut filter | Plano | | 0.300 | Glass | 1.517 | 64.2 | — |
| 11 | | Plano | | 0.324 | | | | |
| 12 | Image | Plano | | — | | | | |

Note:
Reference wavelength (d-line) is 587.6 nm.

TABLE 4

Aspheric Coefficients

| Surface # | 2 | 3 | 4 | 5 |
|---|---|---|---|---|
| k = | −5.2967E−01 | 1.0000E+00 | 7.1461E+00 | −1.0000E+00 |
| A4 = | −1.0121E−01 | −2.3438E−01 | −2.7459E−01 | 1.0988E−01 |
| A6 = | 3.6856E−01 | −1.3149E+00 | −1.8239E+00 | −7.2901E−01 |
| A8 = | −3.9561E+00 | 2.8534E+00 | 4.2577E+00 | −1.1286E−01 |
| A10 = | 7.7715E+00 | 9.6516E−01 | −8.5808E+00 | −1.5592E−01 |
| A12 = | 4.7402E+00 | −3.4996E+01 | 1.6904E+01 | 2.0203E+00 |
| A14 = | −4.5947E+01 | 5.7683E+01 | — | — |

| Surface # | 6 | 7 | 8 | 9 |
|---|---|---|---|---|
| k = | 9.7388E−01 | −3.2987E+00 | −9.0000E+01 | −7.0657E+00 |
| A4 = | 2.1111E−01 | −5.8347E−01 | 1.5371E−01 | −3.5440E−01 |
| A6 = | 2.6958E−01 | 1.2671E+00 | −1.1166E+00 | 5.4544E−01 |
| A8 = | 2.1430E+00 | −1.3478E+00 | 2.7695E+00 | −7.8330E−01 |
| A10 = | −1.2994E+01 | 1.2540E+00 | −3.9803E+00 | 7.5379E−01 |
| A12 = | 2.5141E+01 | 1.6196E+00 | 3.3622E+00 | −4.5945E−01 |
| A14 = | −2.0297E+01 | −1.5592E+00 | −1.4977E+00 | 1.5588E−01 |
| A16 = | 5.8892E+00 | −5.7052E−01 | 2.6980E−01 | −2.1705E−02 |

In the image capturing lens system according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f [mm] | 2.22 | ΣCT/Td | 0.778 |
|---|---|---|---|
| Fno | 2.20 | (Sag22/CT2) × 10 | −0.825 |
| HFOV [deg.] | 34.1 | Sag21/CT2 | −0.633 |
| T12/CT2 | 0.808 | (R3 + R4)/(R3 − R4) | −0.62 |
| T23/CT2 | 0.800 | f1/f3 | 2.278 |
| T12/T23 | 1.010 | |f/f3| + |f/f4| | 4.925 |
| Td [mm] | 2.040 | | |

3rd Embodiment

Figure 5:
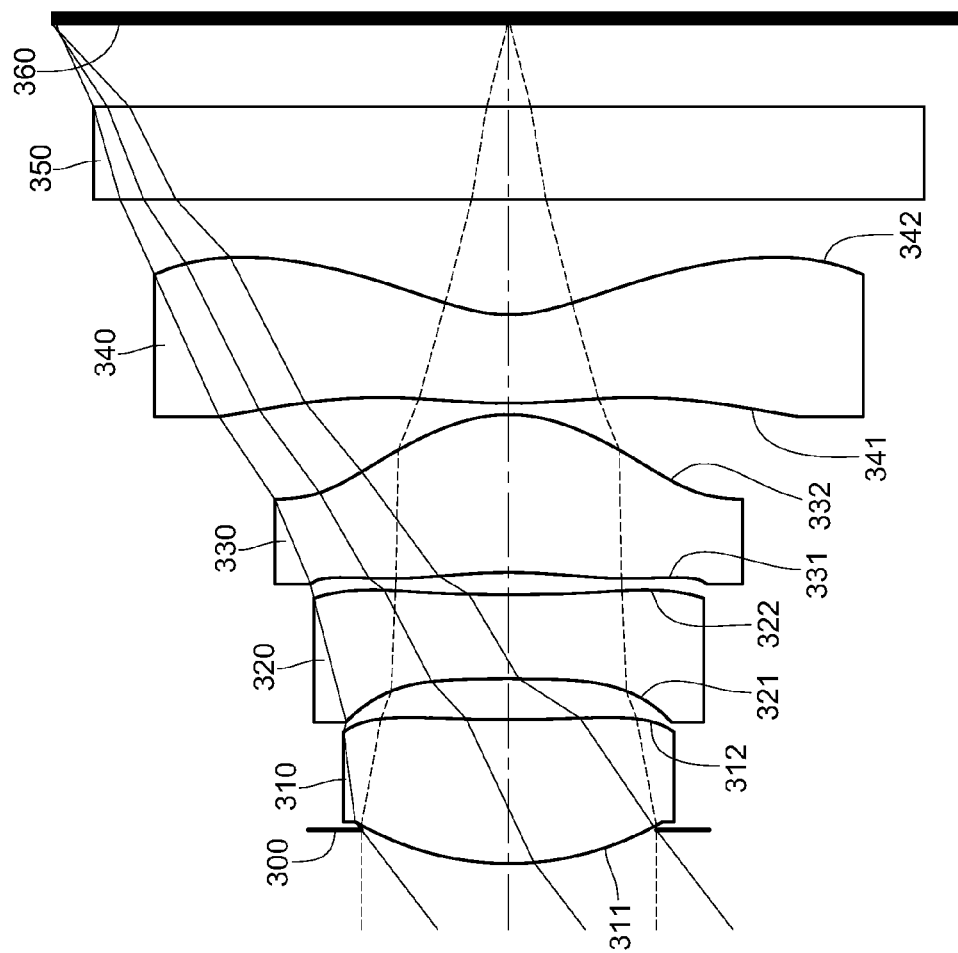
FIG. 5 is a schematic view of an image capturing lens system according to the 3rd embodiment of the present disclosure.
Figure 6:
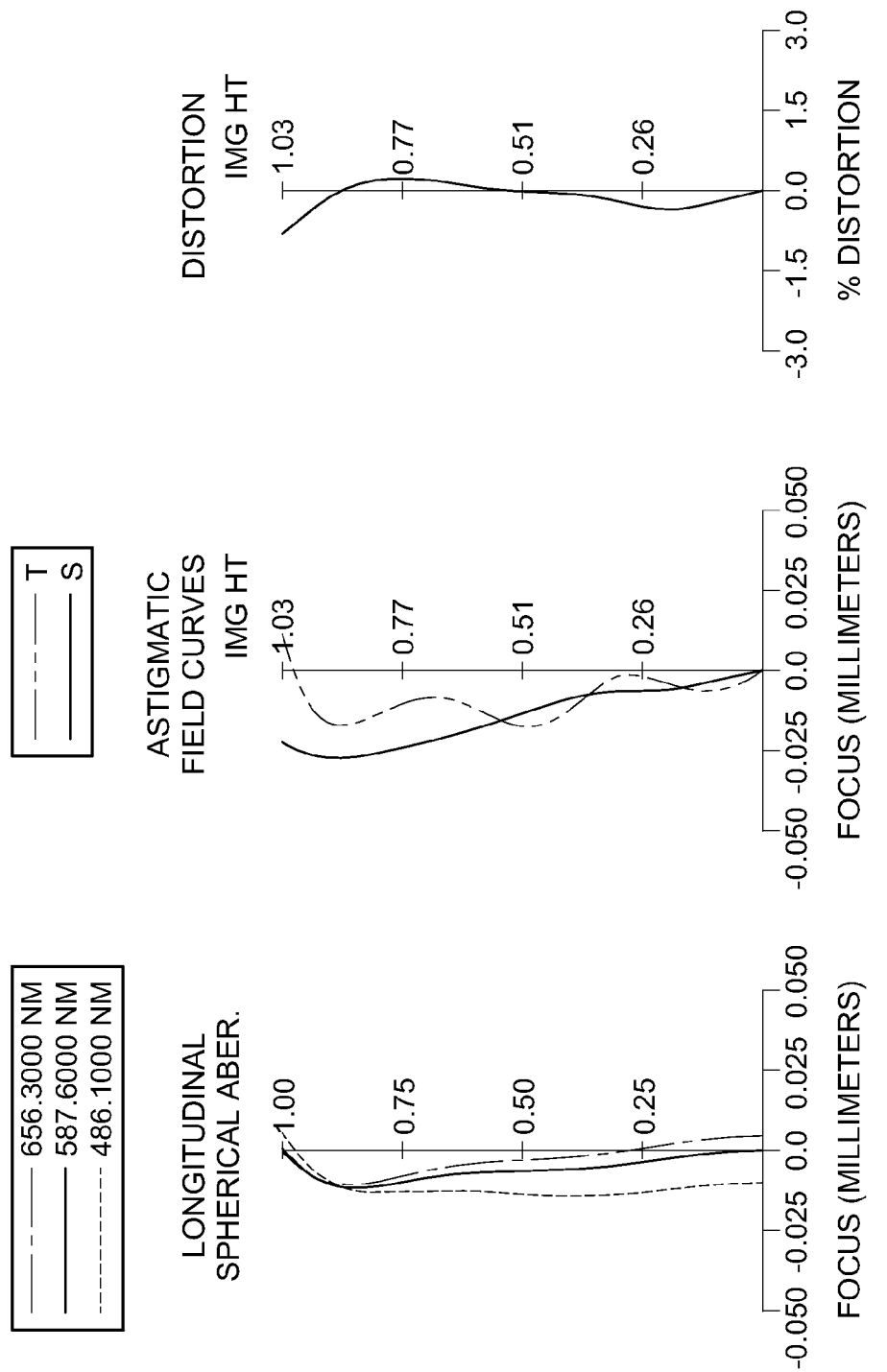
FIG. 6 shows spherical aberration curves, astigmatic field curves and a distortion curve of the image capturing lens system according to the 3rd embodiment.

FIG. 5 is a schematic view of an image capturing lens system according to the 3rd embodiment of the present disclosure. FIG. 6 shows spherical aberration curves, astigmatic field curves and a distortion curve of the image capturing lens system according to the 3rd embodiment. In FIG. 5, the image capturing lens system includes, in order from an object side to an image side, an aperture stop 300, the first lens element 310, the second lens element 320, the third lens element 330, the fourth lens element 340, an IR-cut filter 350, and an image plane 360. There are four lens elements with refractive power.

The first lens element 310 with positive refractive power has a convex object-side surface 311 at a paraxial region and a concave image-side surface 312 at a paraxial region, and is made of plastic material. The object-side surface 311 and the image-side surface 312 of the first lens element 310 are aspheric.

The second lens element 320 with negative refractive power has a concave object-side surface 321 at a paraxial region and a concave image-side surface 322 at a paraxial region, wherein the image-side surface 322 of the second lens element 320 which is made of plastic material changes from concave at the paraxial region to convex at a peripheral region. The object-side surface 321 and the image-side surface 322 of the second lens element 320 are aspheric.

The third lens element 330 with positive refractive power has a concave object-side surface 331 at a paraxial region and a convex image-side surface 332 at a paraxial region, and is made of plastic material. The object-side surface 331 and the image-side surface 332 of the third lens element 330 are aspheric.

The fourth lens element 340 with negative refractive power has a convex object-side surface 341 at a paraxial region and a concave image-side surface 342 at a paraxial region, wherein the image-side surface 342 of the fourth lens element 340 which is made of plastic material changes from concave at the paraxial region to convex at a peripheral region. The object-side surface 341 and the image-side surface 342 of the fourth lens element 340 thereof are aspheric.

The IR-cut filter 350 is made of glass and located between the fourth lens element 340 and the image plane 360, and does not affect the focal length of the image capturing lens system.

The detailed optical data of the 3rd embodiment are shown in Table 5 and the aspheric surface data are shown in Table 6 below.

TABLE 5

3rd Embodiment
f = 1.36 mm, Fno = 2.05, HFOV = 37.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.076 | | | | |
| 2 | Lens 1 | 0.683 | ASP | 0.325 | Plastic | 1.544 | 55.9 | 1.54 |
| 3 | | 3.097 | ASP | 0.092 | | | | |
| 4 | Lens 2 | −4.336 | ASP | 0.190 | Plastic | 1.640 | 23.3 | −3.54 |
| 5 | | 4.808 | ASP | 0.050 | | | | |
| 6 | Lens 3 | −1.181 | ASP | 0.357 | Plastic | 1.544 | 55.9 | 0.73 |
| 7 | | −0.329 | ASP | 0.025 | | | | |
| 8 | Lens 4 | 1.249 | ASP | 0.200 | Plastic | 1.544 | 55.9 | −0.83 |
| 9 | | 0.314 | ASP | 0.260 | | | | |
| 10 | IR-cut filter | Plano | | 0.210 | Glass | 1.517 | 64.2 | — |
| 11 | | Plano | | 0.186 | | | | |
| 12 | Image | Plano | | — | | | | |

Note:
Reference wavelength (d-line) is 587.6 nm.

TABLE 6

Aspheric Coefficients

| Surface # | 2 | 3 | 4 | 5 |
|---|---|---|---|---|
| k = | −1.9151E−01 | −5.1601E+00 | 9.0039E+01 | 6.7630E+01 |
| A4 = | 1.7499E−01 | −4.5973E−01 | −1.6654E+00 | 1.5803E+00 |
| A6 = | −3.2119E+00 | −2.3537E+01 | −4.5013E+01 | −1.6946E+01 |
| A8 = | 5.6863E+01 | 1.8187E+02 | 2.2015E+02 | −1.6129E+01 |
| A10 = | −3.0998E+02 | −8.9745E+02 | 1.4456E+02 | 2.9724E+02 |
| A12 = | — | — | −2.7762E+03 | −5.0906E+02 |

| Surface # | 6 | 7 | 8 | 9 |
|---|---|---|---|---|
| k = | 5.5104E+00 | −2.9975E+00 | −5.7477E+00 | −5.2116E+00 |
| A4 = | 4.4097E+00 | −1.0244E+00 | −3.9633E+00 | −2.0717E+00 |
| A6 = | −7.7799E+00 | −3.6133E+01 | 2.0411E+01 | 9.2174E+00 |
| A8 = | 9.5104E+01 | 8.3577E+01 | −6.6294E+01 | −2.9761E+01 |
| A10 = | −1.8623E+03 | −1.1739E+02 | 1.3457E+02 | 6.2884E+01 |
| A12 = | 1.1900E+04 | −3.4555E+02 | −1.6995E+02 | −8.3671E+01 |
| A14 = | −2.8341E+04 | 2.1688E+02 | 1.4221E+02 | 6.2288E+01 |
| A16 = | 1.5606E+04 | 9.9668E+02 | −6.9067E+01 | −1.9488E+01 |

In the image capturing lens system according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f [mm] | 1.36 | ΣCT/Td | 0.865 |
| Fno | 2.05 | (Sag22/CT2) × 10 | −0.415 |
| HFOV [deg.] | 37.4 | Sag21/CT2 | −0.513 |
| T12/CT2 | 0.484 | (R3 + R4)/(R3 − R4) | −0.05 |
| T23/CT2 | 0.263 | f1/f3 | 2.106 |
| T12/T23 | 1.840 | |f/f3| + |f/f4| | 3.503 |
| Td [mm] | 1.239 | | |

4th Embodiment

Figure 7:
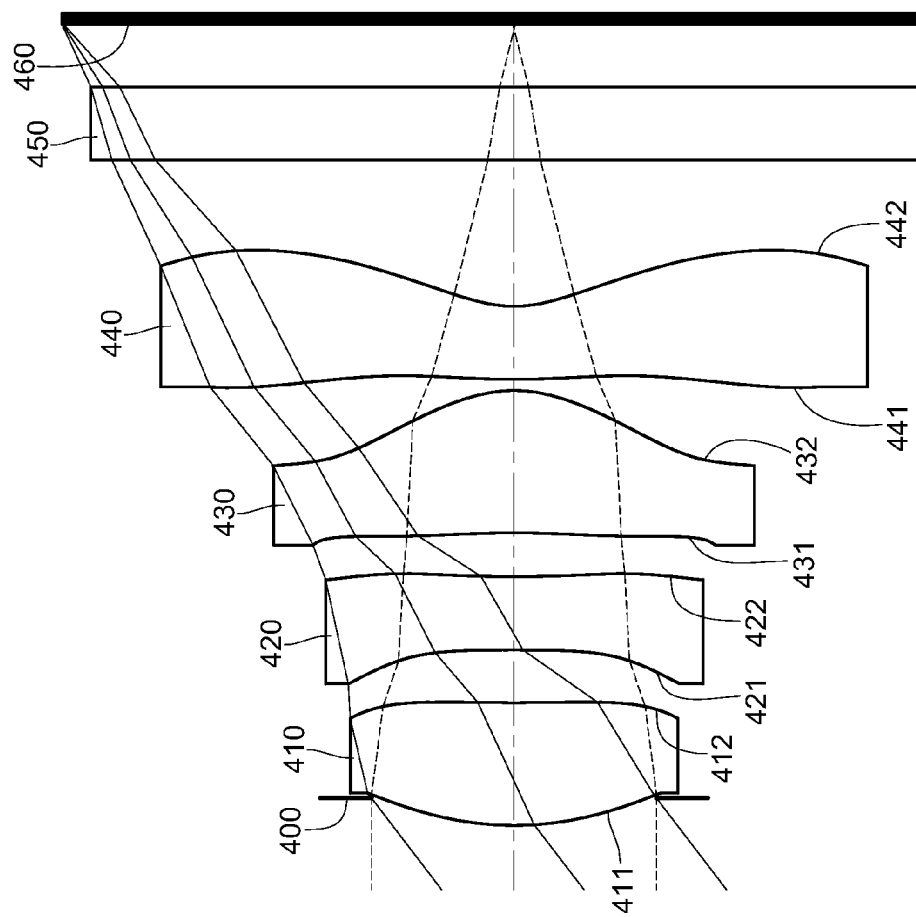
FIG. 7 is a schematic view of an image capturing lens system according to the 4th embodiment of the present disclosure.
Figure 8:
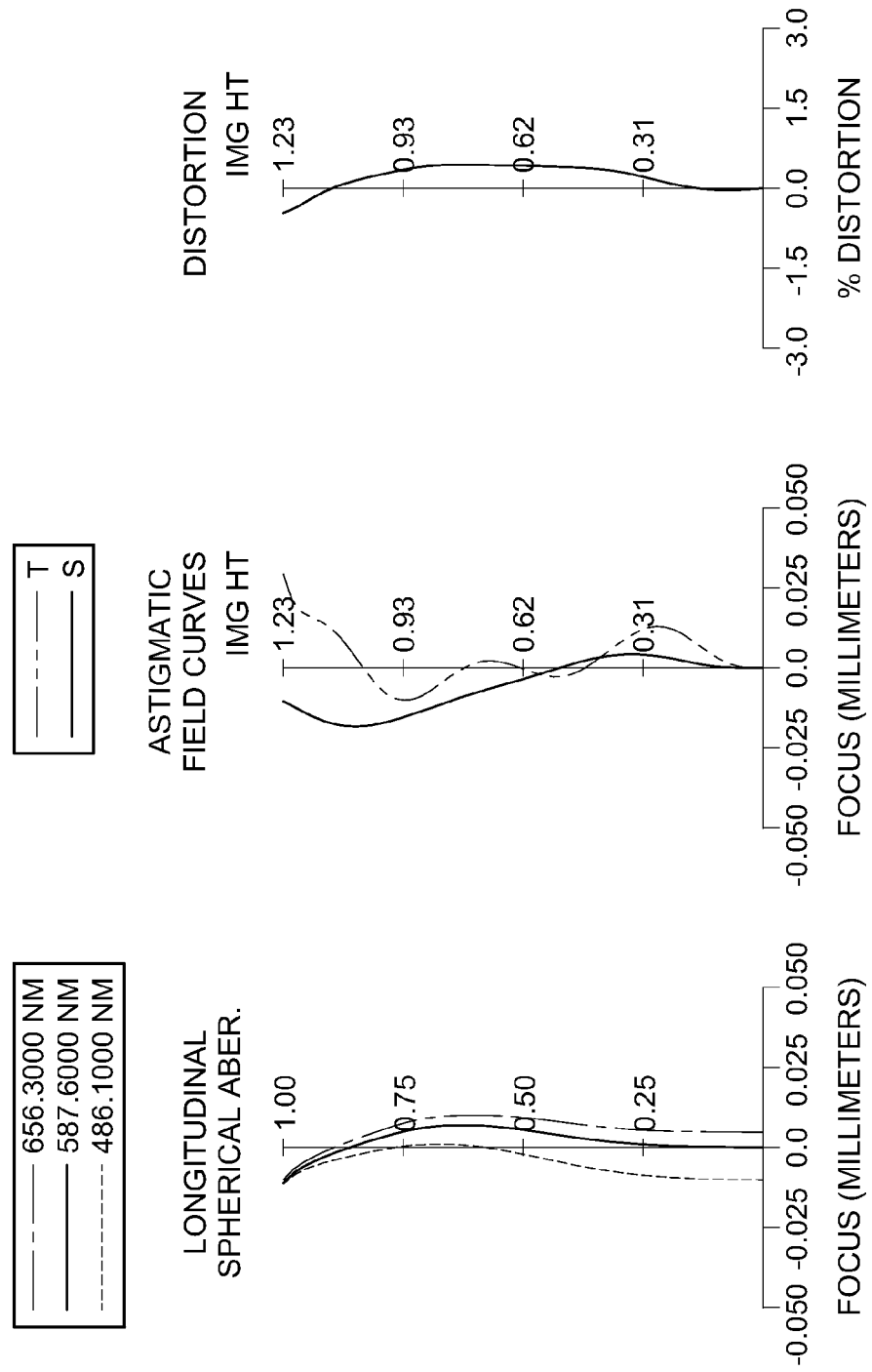
FIG. 8 shows spherical aberration curves, astigmatic field curves and a distortion curve of the image capturing lens system according to the 4th embodiment.

FIG. 7 is a schematic view of an image capturing lens system according to the 4th embodiment of the present disclosure. FIG. 8 shows spherical aberration curves, astigmatic field curves and a distortion curve of the image capturing lens system according to the 4th embodiment. In FIG. 7, the image capturing lens system includes, in order from an object side to an image side, an aperture stop 400, the first lens element 410, the second lens element 420, the third lens element 430, the fourth lens element 440, an IR-cut filter 450, and an image plane 460. There are four lens elements with refractive power.

The first lens element 410 with positive refractive power has a convex object-side surface 411 at a paraxial region and a concave image-side surface 412 at a paraxial region, and is made of plastic material. The object-side surface 411 and the image-side surface 412 of the first lens element 410 are aspheric.

The second lens element 420 with negative refractive power has a concave object-side surface 421 at a paraxial region and a concave image-side surface 422 at a paraxial region, wherein the image-side surface 422 of the second lens element 420 which is made of plastic material changes from concave at the paraxial region to convex at a peripheral region. The object-side surface 421 and the image-side surface 422 of the second lens element 420 are aspheric.

The third lens element 430 with positive refractive power has a concave object-side surface 431 at a paraxial region and a convex image-side surface 432 at a paraxial region, and is made of plastic material. The object-side surface 431 and the image-side surface 432 of the third lens element 430 are aspheric.

The fourth lens element 440 with negative refractive power has a convex object-side surface 441 at a paraxial region and a concave image-side surface 442 at a paraxial region, wherein the image-side surface 442 of the fourth lens element 440 which is made of plastic material changes from concave at the paraxial region to convex at a peripheral region. The object-side surface 441 and the image-side surface 442 of the fourth lens element 440 thereof are aspheric.

The IR-cut filter 450 is made of glass and located between the fourth lens element 440 and the image plane 460, and does not affect the focal length of the image capturing lens system.

The detailed optical data of the 4th embodiment are shown in Table 7 and the aspheric surface data are shown in Table 8 below.

TABLE 7

4th Embodiment
f = 1.62 mm, Fno = 2.08, HFOV = 37.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.074 | | | | |
| 2 | Lens 1 | 0.870 | ASP | 0.336 | Plastic | 1.544 | 55.9 | 1.81 |
| 3 | | 6.337 | ASP | 0.144 | | | | |
| 4 | Lens 2 | −7.468 | ASP | 0.200 | Plastic | 1.640 | 23.3 | −3.19 |
| 5 | | 2.832 | ASP | 0.120 | | | | |
| 6 | Lens 3 | −2.722 | ASP | 0.390 | Plastic | 1.544 | 55.9 | 0.71 |
| 7 | | −0.356 | ASP | 0.030 | | | | |
| 8 | Lens 4 | 1.867 | ASP | 0.200 | Plastic | 1.544 | 55.9 | −0.76 |
| 9 | | 0.327 | ASP | 0.400 | | | | |
| 10 | IR-cut filter | Plano | | 0.200 | Glass | 1.517 | 64.2 | — |
| 11 | | Plano | | 0.171 | | | | |
| 12 | Image | Plano | | — | | | | |

Note:
Reference wavelength (d-line) is 587.6 nm.

TABLE 8

Aspheric Coefficients

| Surface # | 2 | 3 | 4 | 5 |
|---|---|---|---|---|
| k = | −1.1743E+00 | −9.0000E+01 | −3.7453E+01 | 2.3076E+01 |
| A4 = | 9.9589E−02 | −8.7860E−01 | −2.0774E+00 | −8.0543E−01 |
| A6 = | −1.3397E+00 | −2.7559E+00 | −3.7878E+00 | −3.6426E+00 |
| A8 = | 9.3531E+00 | 9.1415E−01 | −4.1628E+00 | 1.0666E+01 |
| A10 = | −5.7400E+01 | −5.3813E+00 | 2.2081E+02 | — |
| A12 = | — | — | −4.3270E+02 | — |

| Surface # | 6 | 7 | 8 | 9 |
|---|---|---|---|---|
| k = | 2.1861E+01 | −4.2371E+00 | −1.0968E+01 | −5.4808E+00 |
| A4 = | 1.4367E+00 | −1.0932E+00 | −2.1310E+00 | −1.2323E+00 |
| A6 = | −7.6289E+00 | 3.4222E+00 | 7.8637E+00 | 3.7400E+00 |
| A8 = | 7.0876E+01 | 1.6547E+01 | −1.7970E+01 | −8.4664E+00 |
| A10 = | −4.3304E+02 | −4.9139E+01 | 2.7942E+01 | 1.2799E+01 |
| A12 = | 1.3536E+03 | −2.9061E+01 | −2.7634E+01 | −1.2172E+01 |
| A14 = | −1.9152E+03 | 1.8355E+02 | 1.5451E+01 | 6.4477E+00 |
| A16 = | 6.4819E+02 | −1.4039E+02 | −3.6964E+00 | −1.4219E+00 |

In the image capturing lens system according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| f [mm] | 1.62 | ΣCT/Td | 0.793 |
|---|---|---|---|
| Fno | 2.08 | (Sag22/CT2) × 10 | −0.366 |
| HFOV [deg.] | 37.4 | Sag21/CT2 | −0.465 |
| T12/CT2 | 0.720 | (R3 + R4)/(R3 − R4) | 0.45 |
| T23/CT2 | 0.600 | f1/f3 | 2.548 |
| T12/T23 | 1.200 | |f/f3| + |f/f4| | 4.397 |
| Td [mm] | 1.420 | | |

5th Embodiment

Figure 9:
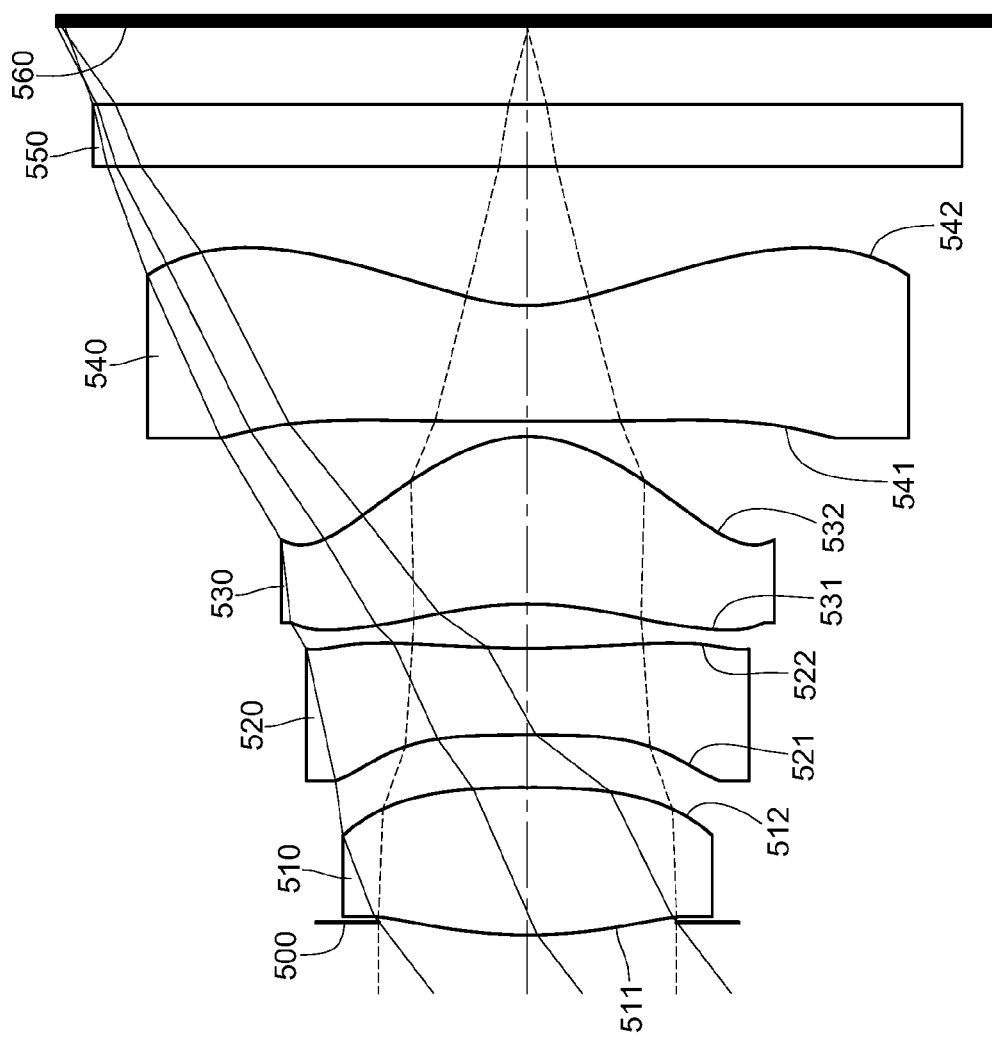
FIG. 9 is a schematic view of an image capturing lens system according to the 5th embodiment of the present disclosure.
Figure 10:
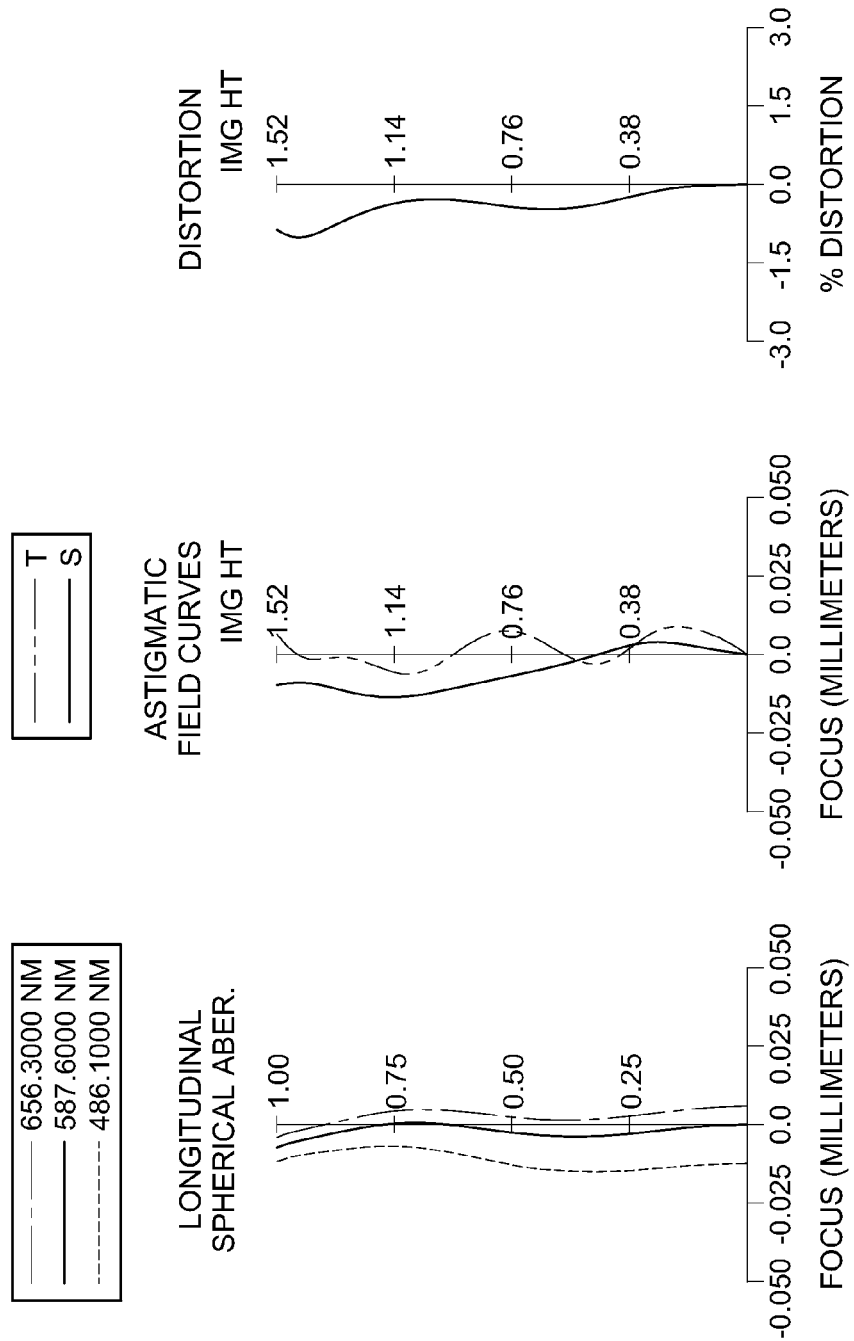
FIG. 10 shows spherical aberration curves, astigmatic field curves and a distortion curve of the image capturing lens system according to the 5th embodiment.

FIG. 9 is a schematic view of an image capturing lens system according to the 5th embodiment of the present disclosure. FIG. 10 shows spherical aberration curves, astigmatic field curves and a distortion curve of the image capturing lens system according to the 5th embodiment. In FIG. 9, the image capturing lens system includes, in order from an object side to an image side, an aperture stop 500, the first lens element 510, the second lens element 520, the third lens element 530, the fourth lens element 540, an IR-cut filter 550, and an image plane 560. There are four lens elements with refractive power.

The first lens element 510 with positive refractive power has a convex object-side surface 511 at a paraxial region and a convex image-side surface 512 at a paraxial region, and is made of plastic material. The object-side surface 511 and the image-side surface 512 of the first lens element 510 are aspheric.

The second lens element 520 with negative refractive power has a concave object-side surface 521 at a paraxial region and a concave image-side surface 522 at a paraxial region, wherein the image-side surface 522 of the second lens element 520 which is made of plastic material changes from concave at the paraxial region to convex at a peripheral region. The object-side surface 521 and the image-side surface 522 of the second lens element 520 are aspheric.

The third lens element 530 with positive refractive power has a concave object-side surface 531 at a paraxial region and a convex image-side surface 532 at a paraxial region, and is made of plastic material. The object-side surface 531 and the image-side surface 532 of the third lens element 530 are aspheric.

The fourth lens element 540 with negative refractive power has a concave object-side surface 541 at a paraxial region and a concave image-side surface 542 at a paraxial region, and the image-side surface 542 of the fourth lens element 540 which is made of plastic material changes from concave at the paraxial region to convex at a peripheral region. The object-side surface 541 and the image-side surface 542 of the fourth lens element 540 thereof are aspheric.

The IR-cut filter 550 is made of glass and located between the fourth lens element 540 and the image plane 560, and does not affect the focal length of the image capturing lens system.

The detailed optical data of the 5th embodiment are shown in Table 9 and the aspheric surface data are shown in Table 10 below.

TABLE 9

5th Embodiment
f = 2.00 mm, Fno = 2.08, HFOV = 37.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.041 | | | | |
| 2 | Lens 1 | 1.565 | ASP | 0.477 | Plastic | 1.544 | 55.9 | 2.00 |
| 3 | | −3.180 | ASP | 0.170 | | | | |
| 4 | Lens 2 | −7.308 | ASP | 0.280 | Plastic | 1.634 | 23.8 | −3.80 |
| 5 | | 3.648 | ASP | 0.142 | | | | |
| 6 | Lens 3 | −1.291 | ASP | 0.542 | Plastic | 1.544 | 55.9 | 0.90 |
| 7 | | −0.408 | ASP | 0.050 | | | | |
| 8 | Lens 4 | −50.000 | ASP | 0.372 | Plastic | 1.544 | 55.9 | −0.98 |
| 9 | | 0.540 | ASP | 0.450 | | | | |
| 10 | IR-cut filter | Plano | | 0.200 | Glass | 1.517 | 64.2 | — |
| 11 | | Plano | | 0.252 | | | | |
| 12 | Image | Plano | | — | | | | |

Note:
Reference wavelength (d-line) is 587.6 nm.

TABLE 10

Aspheric Coefficients

| Surface # | 2 | 3 | 4 | 5 |
|---|---|---|---|---|
| k = | −7.6502E−01 | −9.8330E+00 | −2.9563E−01 | −1.0000E+00 |
| A4 = | −1.1794E−01 | −7.2144E−01 | −1.0090E+00 | −3.4592E−01 |
| A6 = | −7.5448E−01 | −2.4271E−01 | −1.1457E+00 | 8.3400E−01 |
| A8 = | 1.9908E+00 | −5.6462E−01 | −1.5911E+00 | −2.3188E+00 |
| A10 = | −9.2872E+00 | 2.8312E+00 | 2.4782E+01 | −2.8805E+00 |
| A12 = | 6.3709E−01 | −1.8205E+00 | −2.5373E+01 | 9.2674E+00 |
| A14 = | −4.1868E−01 | −7.1990E+00 | — | — |

| Surface # | 6 | 7 | 8 | 9 |
|---|---|---|---|---|
| k = | 1.7510E−01 | −3.0798E+00 | −1.0000E+00 | −7.4198E+00 |
| A4 = | 1.2847E−01 | −9.6377E+00 | 2.0736E−01 | −2.6022E−01 |
| A6 = | 5.1117E+00 | 2.6770E+00 | −6.9578E−01 | 4.1459E−01 |
| A8 = | 1.9915E+01 | −3.5915E+00 | 8.5847E−01 | −6.4646E−01 |
| A10 = | −1.1262E+02 | 2.1394E+00 | −5.8299E−01 | 6.1971E−01 |
| A12 = | 2.4908E+02 | 9.0030E+00 | −4.0628E−02 | −3.6705E−01 |
| A14 = | −2.4838E+02 | −1.4722E+01 | 3.5286E−01 | 1.1884E−01 |
| A16 = | 9.3011E+01 | 5.4937E+00 | −1.4678E−01 | −1.5650E−02 |

In the image capturing lens system according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f [mm] | 2.00 | ΣCT/Td | 0.822 |
| Fno | 2.08 | (Sag22/CT2) × 10 | −0.094 |
| HFOV [deg.] | 37.5 | Sag21/CT2 | −0.533 |
| T12/CT2 | 0.607 | (R3 + R4)/(R3 − R4) | 0.33 |
| T23/CT2 | 0.507 | f1/f3 | 2.220 |
| T12/T23 | 1.197 | |f/f3| + |f/f4| | 4.262 |
| Td [mm] | 2.033 | | |

6th Embodiment

Figure 11:
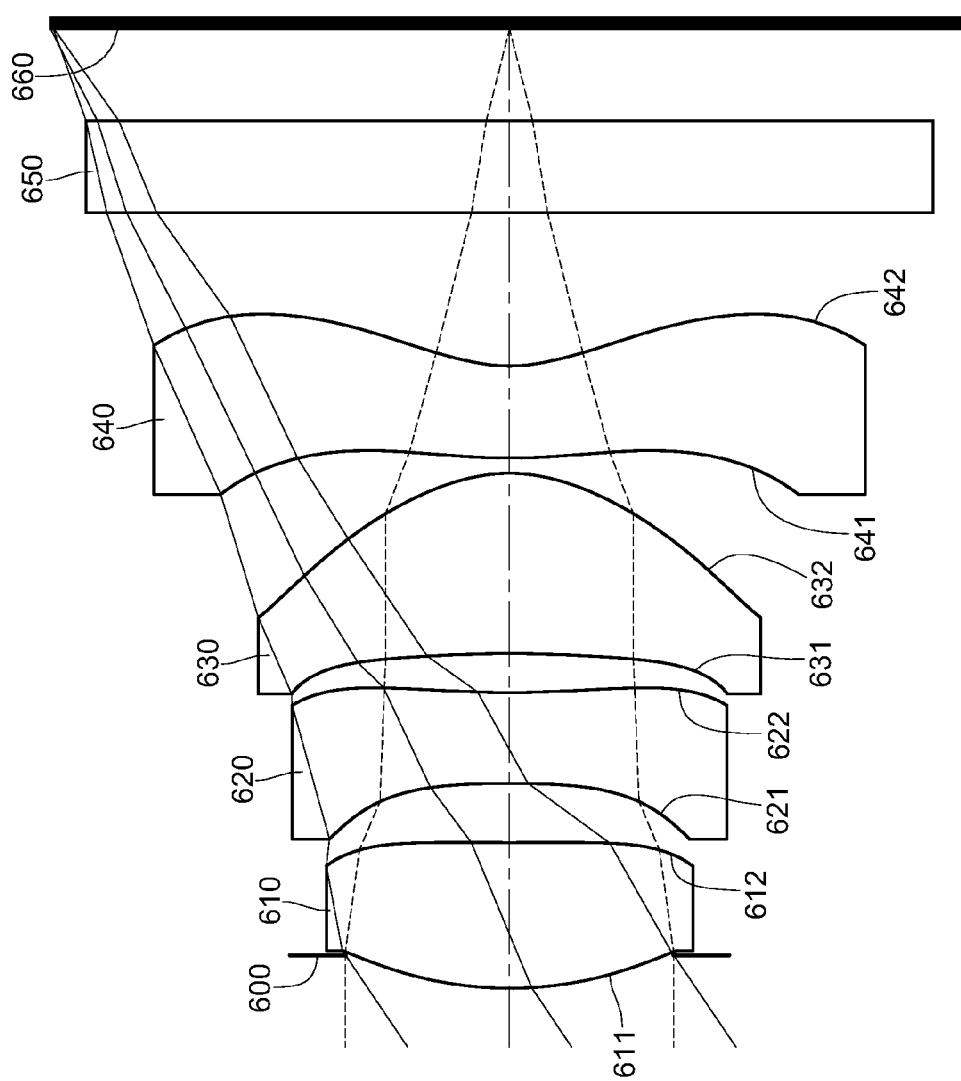
FIG. 11 is a schematic view of an image capturing lens system according to the 6th embodiment of the present disclosure.
Figure 12:
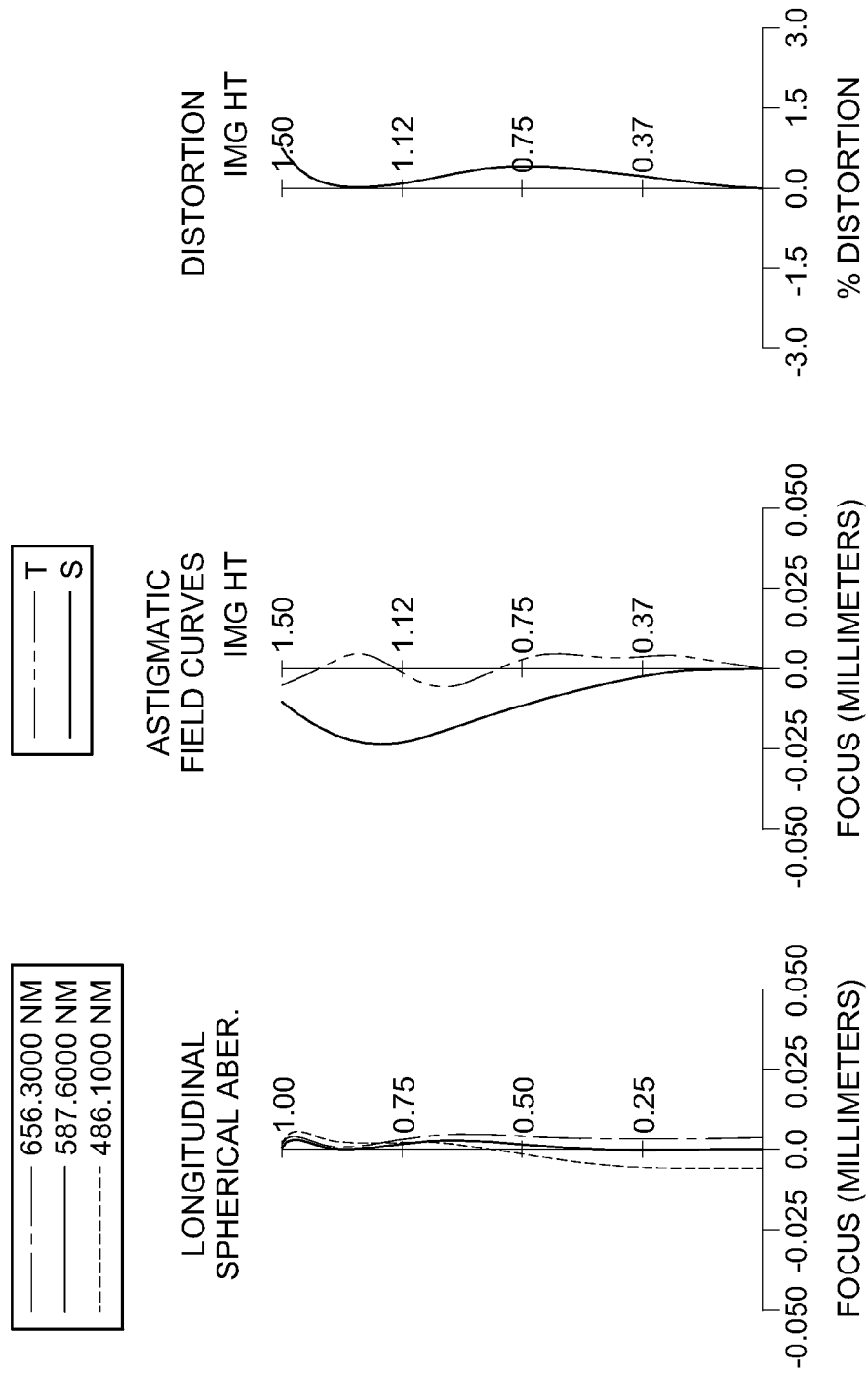
FIG. 12 shows spherical aberration curves, astigmatic field curves and a distortion curve of the image capturing lens system according to the 6th embodiment.

FIG. 11 is a schematic view of an image capturing lens system according to the 6th embodiment of the present disclosure. FIG. 12 shows spherical aberration curves, astigmatic field curves and a distortion curve of the image capturing lens system according to the 6th embodiment. In FIG. 11, the image capturing lens system includes, in order from an object side to an image side, an aperture stop 600, the first lens element 610, the second lens element 620, the third lens element 630, the fourth lens element 640, an IR-cut filter 650, and an image plane 660. There are four lens elements with refractive power.

The first lens element 610 with positive refractive power has a convex object-side surface 611 at a paraxial region and a concave image-side surface 612 at a paraxial region, and is made of plastic material. The object-side surface 611 and the image-side surface 612 of the first lens element 610 are aspheric.

The second lens element 620 with negative refractive power has a concave object-side surface 621 at a paraxial region and a concave image-side surface 622 at a paraxial region, wherein the image-side surface 622 of the second lens element 620 which is made of plastic material changes from concave at the paraxial region to convex at a peripheral region. The object-side surface 621 and the image-side surface 622 of the second lens element 620 are aspheric.

The third lens element 630 with positive refractive power has a concave object-side surface 631 at a paraxial region and a convex image-side surface 632 at a paraxial region, and is made of plastic material. The object-side surface 631 and the image-side surface 632 of the third lens element 630 are aspheric.

The fourth lens element 640 with negative refractive power has a convex object-side surface 641 at a paraxial region and a concave image-side surface 642 at a paraxial region, wherein the image-side surface 642 of the fourth lens element 640 which is made of plastic material changes from concave at the paraxial region to convex at a peripheral region. The object-side surface 641 and the image-side surface 642 of the fourth lens element 640 thereof are aspheric.

The IR-cut filter 650 is made of glass and located between the fourth lens element 640 and the image plane 660, and does not affect the focal length of the image capturing lens system.

The detailed optical data of the 6th embodiment are shown in Table 11 and the aspheric surface data are shown in Table 12 below.

TABLE 11

6th Embodiment
f = 2.19 mm, Fno = 2.05, HFOV = 34.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.108 | | | | |
| 2 | Lens 1 | 1.208 | ASP | 0.476 | Plastic | 1.562 | 58.3 | 2.21 |
| 3 | | 39.248 | ASP | 0.193 | | | | |
| 4 | Lens 2 | −3.220 | ASP | 0.296 | Plastic | 1.634 | 23.8 | −2.58 |
| 5 | | 3.445 | ASP | 0.127 | | | | |
| 6 | Lens 3 | −3.689 | ASP | 0.588 | Plastic | 1.535 | 55.7 | 1.10 |
| 7 | | −0.535 | ASP | 0.050 | | | | |
| 8 | Lens 4 | 2.011 | ASP | 0.300 | Plastic | 1.535 | 55.7 | 1.49 |
| 9 | | 0.541 | ASP | 0.500 | | | | |
| 10 | IR-cut filter | Plano | | 0.300 | Glass | 1.517 | 64.2 | — |
| 11 | | Plano | | 0.300 | | | | |
| 12 | Image | Plano | | — | | | | |

Note:
Reference wavelength (d-line) is 587.6 nm.

TABLE 12

Aspheric Coefficients

| Surface # | 2 | 3 | 4 | 5 |
|---|---|---|---|---|
| k = | 2.6596E−01 | 1.0000E+02 | −1.2682E+00 | −6.8889E+00 |
| A4 = | −2.7412E−02 | −2.9788E+01 | −8.5587E−01 | −2.2711E−01 |
| A6 = | 9.6365E−05 | −1.1014E+02 | −8.8276E−01 | −6.1601E−01 |
| A8 = | −5.7271E−01 | −6.5611E+00 | 1.1435E+00 | 8.1073E−01 |
| A10 = | −2.7369E+00 | 2.5414E+01 | −1.2894E+01 | −4.5806E−01 |
| A12 = | 1.9712E+01 | −6.0897E+01 | 3.2853E+01 | −8.0752E−01 |
| A14 = | −4.5945E+01 | 5.6061E+01 | — | — |

| Surface # | 6 | 7 | 8 | 9 |
|---|---|---|---|---|
| k = | 2.3785E+01 | −3.6890E+00 | −1.0000E+00 | −5.1583E+00 |
| A4 = | 4.0708E−01 | −6.5373E−01 | −7.1247E−01 | −4.9588E−01 |
| A6 = | −1.5021E+00 | 9.4055E−01 | 1.7127E−01 | 6.3966E−01 |
| A8 = | 3.3439E+00 | −1.2862E+00 | 1.4781E+00 | −7.5986E−01 |
| A10 = | −1.0232E+01 | 9.7604E−01 | −3.5206E+00 | 6.7546E−01 |
| A12 = | 2.1976E+01 | 6.5679E−01 | 3.9297E+00 | −4.2781E−01 |
| A14 = | −2.6636E+01 | −2.0234E+00 | −2.4450E+00 | 1.5720E−01 |
| A16 = | 9.7056E+00 | 1.7142E+00 | 6.8445E−01 | −2.3470E−02 |

In the image capturing lens system according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f [mm] | 2.19 | ΣCT/Td | 0.818 |
| Fno | 2.05 | (Sag22/CT2) × 10 | −1.415 |
| HFOV [deg.] | 34.1 | Sag21/CT2 | −0.614 |
| T12/CT2 | 0.652 | (R3 + R4)/(R3 − R4) | −0.03 |
| T23/CT2 | 0.429 | f1/f3 | 2.011 |
| T12/T23 | 1.520 | |f/f3| + |f/f4| | 3.468 |
| Td [mm] | 2.030 | | |

7th Embodiment

Figure 13:
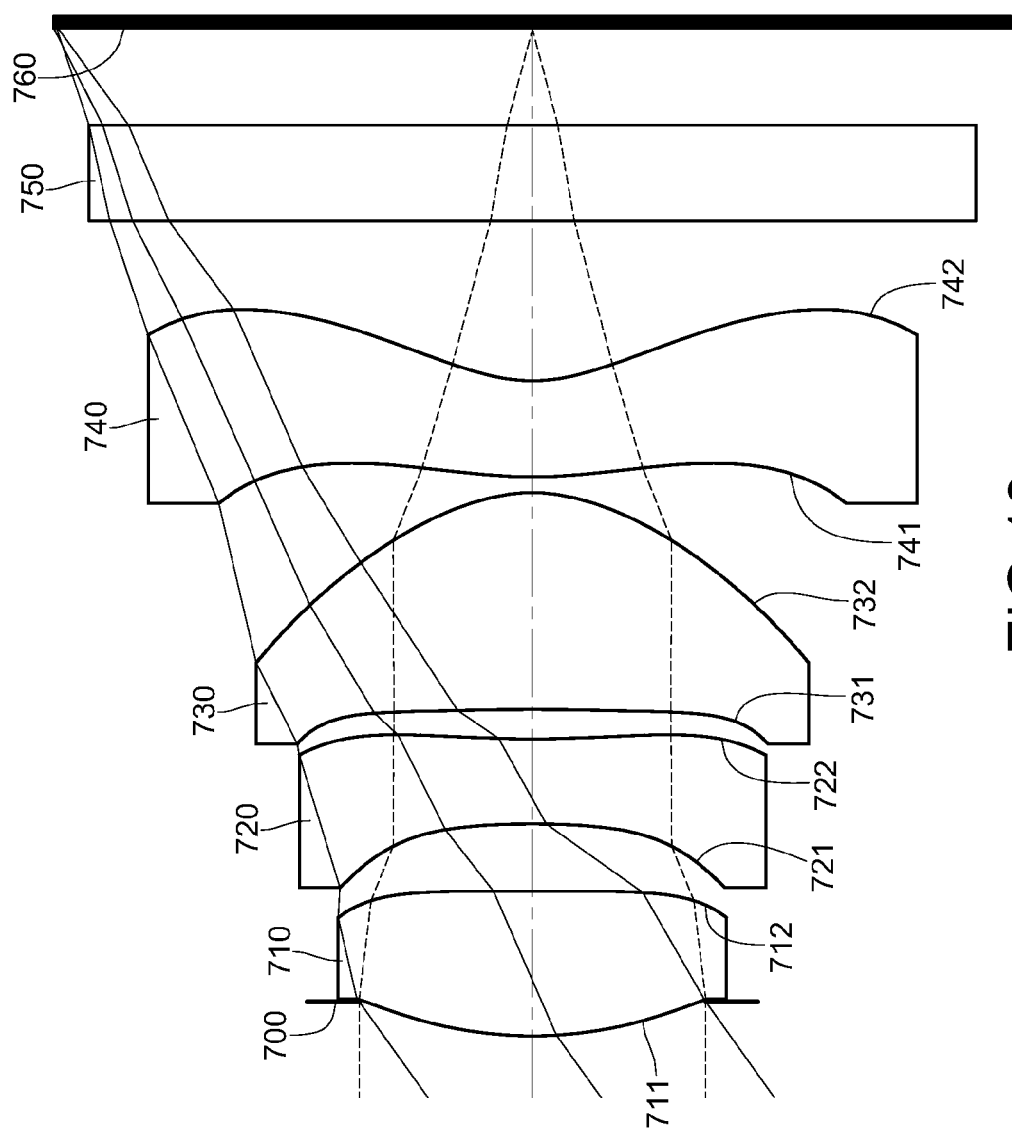
FIG. 13 is a schematic view of an image capturing lens system according to the 7th embodiment of the present disclosure.
Figure 14:
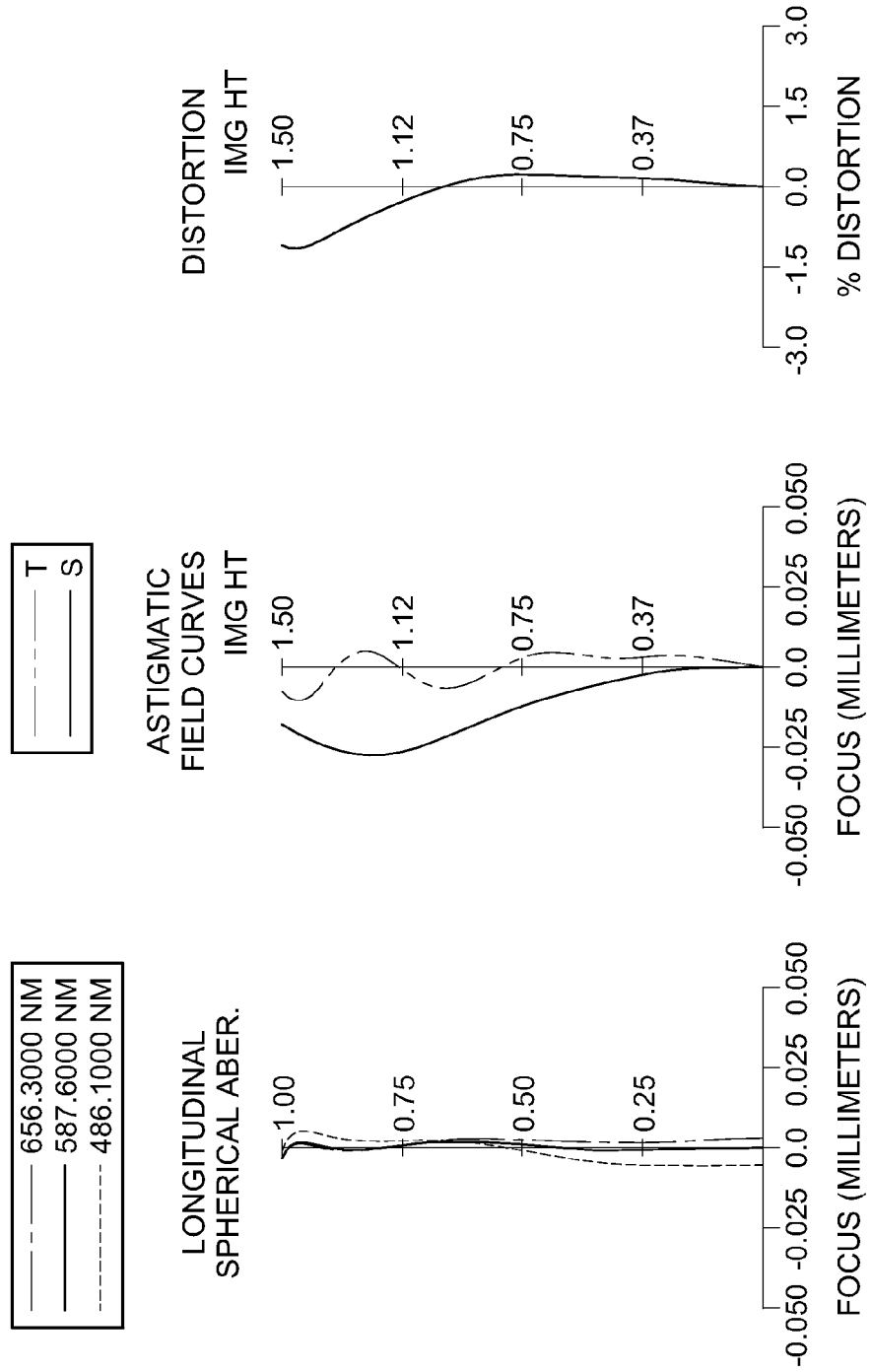
FIG. 14 shows spherical aberration curves, astigmatic field curves and a distortion curve of the image capturing lens system according to the 7th embodiment.

FIG. 13 is a schematic view of an image capturing lens system according to the 7th embodiment of the present disclosure. FIG. 14 shows spherical aberration curves, astigmatic field curves and a distortion curve of the image capturing lens system according to the 7th embodiment. In FIG. 13, the image capturing lens system includes, in order from an object side to an image side, an aperture stop 700, the first lens element 710, the second lens element 720, the third lens element 730, the fourth lens element 740, an IR-cut filter 750, and an image plane 760. There are four lens elements with refractive power.

The first lens element 710 with positive refractive power has a convex object-side surface 711 at a paraxial region and a plane image-side surface 712 at a paraxial region, and is made of plastic material. The object-side surface 711 and the image-side surface 712 of the first lens element 710 are aspheric.

The second lens element 720 with negative refractive power has a concave object-side surface 721 at a paraxial region and a concave image-side surface 722 at a paraxial region, wherein the image-side surface 722 of the second lens element 720 which is made of plastic material changes from concave at the paraxial region to convex at a peripheral region. The object-side surface 721 and the image-side surface 722 of the second lens element 720 are aspheric.

The third lens element 730 with positive refractive power has a concave object-side surface 731 at a paraxial region and a convex image-side surface 732 at a paraxial region, and is made of plastic material. The object-side surface 731 and the image-side surface 732 of the third lens element 730 are aspheric.

The fourth lens element 740 with negative refractive power has a convex object-side surface 741 at a paraxial region and a concave image-side surface 742 at a paraxial region, and the image-side surface 742 of the fourth lens element 740 which is made of plastic material changes from concave at the paraxial region to convex at a peripheral region. The object-side surface 741 and the image-side surface 742 of the fourth lens element 740 thereof are aspheric.

The IR-cut filter 750 is made of glass and located between the fourth lens element 740 and the image plane 760, and does not affect the focal length of the image capturing lens system.

The detailed optical data of the 7th embodiment are shown in Table 13 and the aspheric surface data are shown in Table 14 below.

TABLE 13

7th Embodiment
f = 2.11 mm, Fno = 1.95, HFOV = 35.6 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.107 | | | | |
| 2 | Lens 1 | 1.268 | ASP | 0.453 | Plastic | 1.544 | 55.9 | 2.33 |
| 3 | | ∞ | ASP | 0.210 | | | | |
| 4 | Lens 2 | −2.812 | ASP | 0.266 | Plastic | 1.642 | 22.8 | −2.48 |
| 5 | | 3.806 | ASP | 0.092 | | | | |
| 6 | Lens 3 | −6.325 | ASP | 0.678 | Plastic | 1.535 | 55.7 | 1.05 |
| 7 | | −0.534 | ASP | 0.050 | | | | |
| 8 | Lens 4 | 1.649 | ASP | 0.300 | Plastic | 1.535 | 55.7 | −1.46 |
| 9 | | 0.496 | ASP | 0.500 | | | | |
| 10 | IR-cut filter | Plano | | 0.300 | Glass | 1.517 | 64.2 | — |
| 11 | | Plano | | 0.303 | | | | |
| 12 | Image | Plano | | — | | | | |

Note:
Reference wavelength (d-line) is 587.6 nm.

TABLE 14

Aspheric Coefficients

| Surface # | 2 | 3 | 4 | 5 |
|---|---|---|---|---|
| k = | 2.2941E−01 | −1.0000E+00 | −6.2569E−01 | 1.6310E+00 |
| A4 = | −2.4239E−02 | −2.7970E−01 | −8.8109E−01 | −2.4916E−01 |
| A6 = | −7.7457E−02 | 9.9309E−02 | −5.9992E−01 | −5.6583E−01 |
| A8 = | 1.6800E−02 | −6.9296E+00 | 7.8768E−01 | 8.1800E−01 |
| A10 = | −5.1007E+00 | 2.7098E+01 | −1.1347E+01 | −1.5953E+00 |
| A12 = | 2.2987E+01 | −6.3329E+01 | 2.9545E+01 | 1.5946E+00 |
| A14 = | −4.5849E+01 | 5.6040E+01 | — | — |

| Surface # | 6 | 7 | 8 | 9 |
|---|---|---|---|---|
| k = | 6.9803E+01 | −3.7055E+00 | −9.9660E−01 | −4.4991E+00 |
| A4 = | 4.5368E−01 | −6.0635E−01 | −6.6303E−01 | −4.0808E−01 |
| A6 = | −1.6824E+00 | 9.1880E−01 | 2.6643E−01 | 5.7483E−01 |
| A8 = | 3.9921E+00 | −1.2318E+00 | 1.1387E+00 | −7.6037E−01 |
| A10 = | −1.1285E+01 | 1.0464E+00 | −3.3199E+00 | 6.9676E−01 |
| A12 = | 2.0321E+01 | 4.0605E−01 | 4.0554E+00 | −4.1900E−01 |
| A14 = | −2.3196E+01 | −2.5228E+00 | −2.5446E+00 | 1.4013E−01 |
| A16 = | 1.1152E+01 | 1.8870E+00 | 6.6342E−01 | −1.8869E−02 |

In the image capturing lens system according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f [mm] | 2.11 | ΣCT/Td | 0.828 |
| Fno | 1.95 | (Sag22/CT2) × 10 | −1.883 |
| HFOV [deg.] | 35.6 | Sag21/CT2 | −0.749 |
| T12/CT2 | 0.789 | (R3 + R4)/(R3 − R4) | −0.15 |
| T23/CT2 | 0.346 | f1/f3 | 2.224 |
| T12/T23 | 2.283 | |f/f3| + |f/f4| | 3.462 |
| Td [mm] | 2.049 | | |

8th Embodiment

Figure 15:
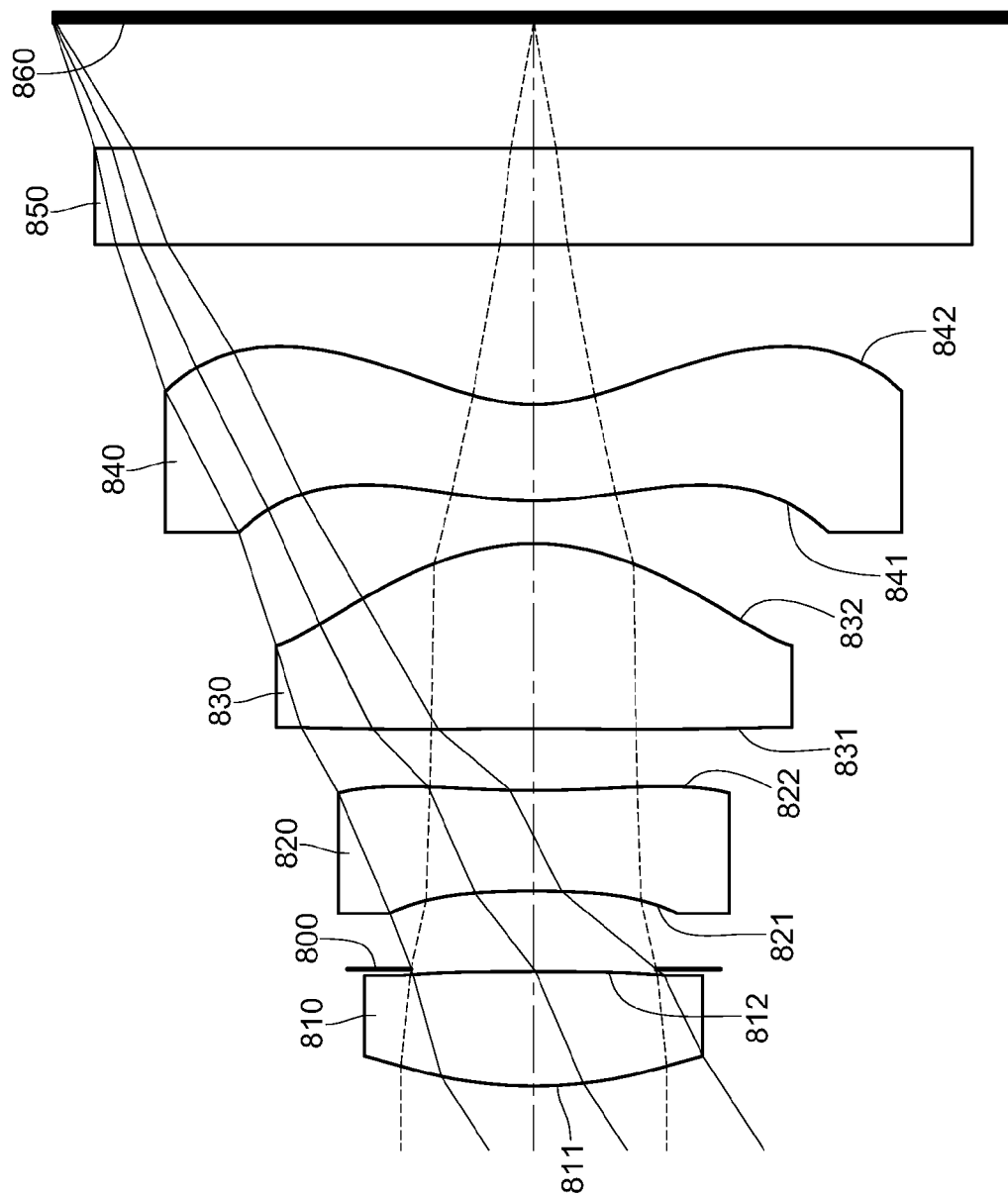
FIG. 15 is a schematic view of an image capturing lens system according to the 8th embodiment of the present disclosure.
Figure 16:
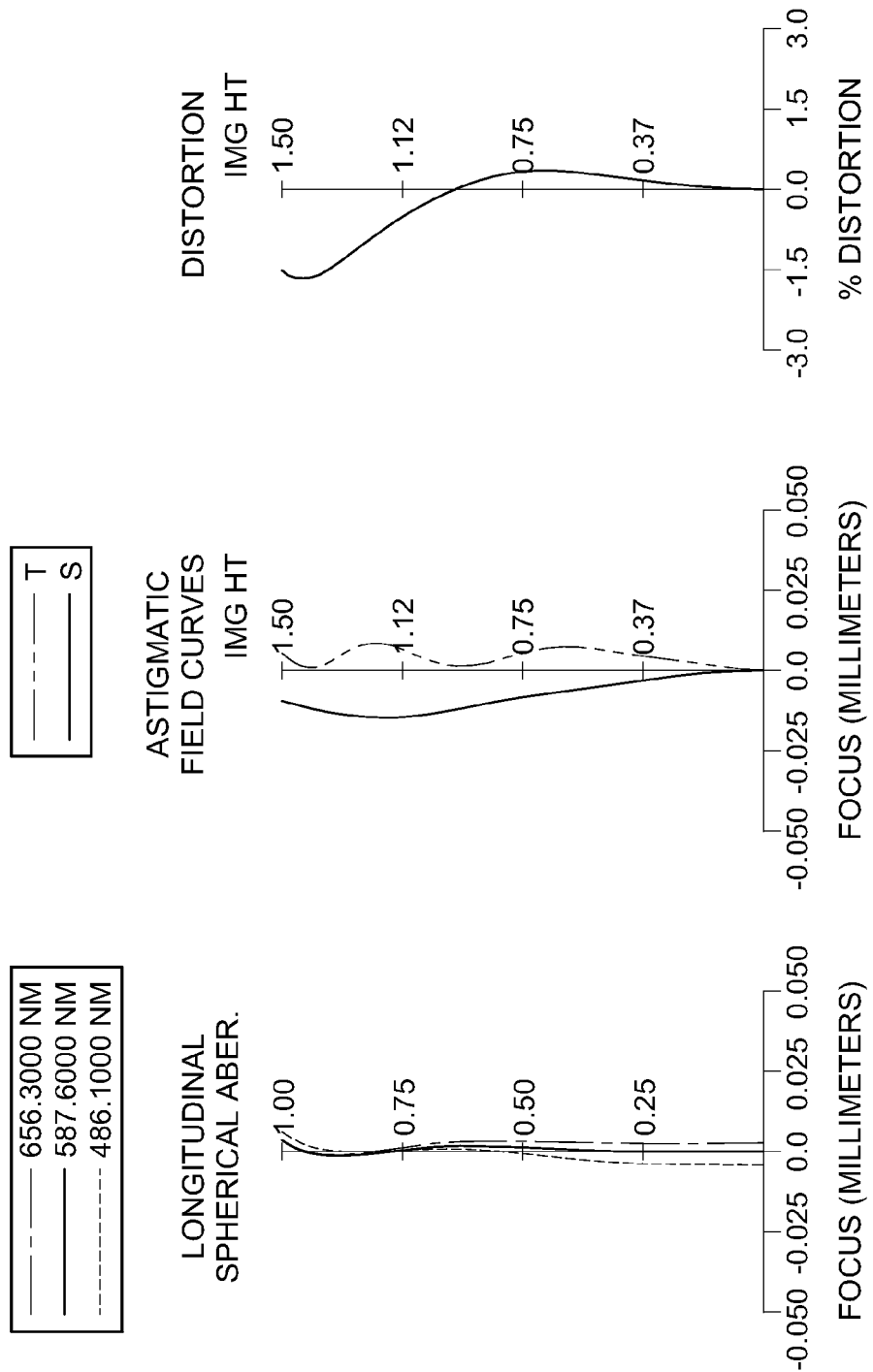
FIG. 16 shows spherical aberration curves, astigmatic field curves and a distortion curve of the image capturing lens system according to the 8th embodiment.

FIG. 15 is a schematic view of an image capturing lens system according to the 8th embodiment of the present disclosure. FIG. 16 shows spherical aberration curves, astigmatic field curves and a distortion curve of the image capturing lens system according to the 8th embodiment. In FIG. 15, the image capturing lens system includes, in order from an object side to an image side, the first lens element 810, an aperture stop 800, the second lens element 820, the third lens element 830, the fourth lens element 840, an IR-cut filter 850, and an image plane 860. There are four lens elements with refractive power.

The first lens element 810 with positive refractive power has a convex object-side surface 811 at a paraxial region and a convex image-side surface 812 at a paraxial region, and is made of plastic material. The object-side surface 811 and the image-side surface 812 of the first lens element 810 are aspheric.

The second lens element 820 with negative refractive power has a concave object-side surface 821 at a paraxial region and a concave image-side surface 822 at a paraxial region, wherein the image-side surface 822 of the second lens element 820 which is made of plastic material changes from concave at the paraxial region to convex at a peripheral region. The object-side surface 821 and the image-side surface 822 of the second lens element 820 are aspheric.

The third lens element 830 with positive refractive power has a concave object-side surface 831 at a paraxial region and a convex image-side surface 832 at a paraxial region, and is made of plastic material. The object-side surface 831 and the image-side surface 832 of the third lens element 830 are aspheric.

The fourth lens element 840 with negative refractive power has a convex object-side surface 841 at a paraxial region and a concave image-side surface 842 at a paraxial region, wherein the image-side surface 842 of the fourth lens element 840 which is made of plastic material changes from concave at the paraxial region to convex at a peripheral region. The object-side surface 841 and the image-side surface 842 of the fourth lens element 840 thereof are aspheric.

The IR-cut filter 850 is made of glass and located between the fourth lens element 840 and the image plane 860, and does not affect the focal length of the image capturing lens system.

The detailed optical data of the 8th embodiment are shown in Table 15 and the aspheric surface data are shown in Table 16 below.

TABLE 15

8th Embodiment
f = 2.34 mm, Fno = 2.83, HFOV = 32.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.377 | ASP | 0.358 | Plastic | 1.544 | 55.9 | 2.41 |
| 2 | | −26.027 | ASP | 0.007 | | | | |
| 3 | Ape. Stop | Plano | | 0.244 | | | | |
| 4 | Lens 2 | −3.107 | ASP | 0.314 | Plastic | 1.640 | 23.3 | −2.54 |
| 5 | | 3.542 | ASP | 0.193 | | | | |
| 6 | Lens 3 | −7.955 | ASP | 0.578 | Plastic | 1.535 | 55.7 | 1.44 |
| 7 | | −0.722 | ASP | 0.134 | | | | |
| 8 | Lens 4 | 1.230 | ASP | 0.300 | Plastic | 1.535 | 55.7 | −2.33 |
| 9 | | 0.566 | ASP | 0.500 | | | | |
| 10 | IR-cut filter | Plano | | 0.300 | Glass | 1.517 | 64.2 | — |
| 11 | | Plano | | 0.391 | | | | |
| 12 | Image | Plano | | — | | | | |

Note:
Reference wavelength (d-line) is 587.6 nm.

TABLE 16

Aspheric Coefficients

| Surface # | 1 | 2 | 4 | 5 |
|---|---|---|---|---|
| k = | 1.5250E−01 | −1.0000E+00 | −1.2966E+01 | 1.2979E+01 |
| A4 = | −2.8330E−02 | −2.5519E−01 | −8.2297E−01 | −3.2077E−01 |
| A6 = | −2.4490E−01 | −6.2462E−02 | −8.1215E−01 | −1.1334E+00 |
| A8 = | 9.6520E−01 | −5.6721E+00 | 2.5151E+00 | 4.0864E+00 |
| A10 = | −1.0354E+01 | 2.3744E+01 | −1.7323E+01 | −9.4086E+00 |
| A12 = | 2.7655E+01 | −6.4717E+01 | 2.9838E+01 | 9.0108E+00 |
| A14 = | −4.5869E+01 | 7.6586E+01 | — | — |

| Surface # | 6 | 7 | 8 | 9 |
|---|---|---|---|---|
| k = | 1.0000E+02 | −3.8739E+00 | −5.9553E+00 | −3.5522E+00 |
| A4 = | 5.0184E−01 | −4.3765E−01 | −6.9775E−01 | −6.3808E−01 |
| A6 = | −1.7101E+00 | 8.7053E−01 | 2.5441E−01 | 8.3820E−01 |
| A8 = | 4.8176E+00 | −1.1327E+00 | 1.1286E+00 | −9.4349E−01 |
| A10 = | −1.1247E+01 | 1.0660E+00 | −3.2014E+00 | 7.2488E−01 |
| A12 = | 1.9750E+01 | 4.9227E−01 | 3.9400E+00 | −3.8897E−01 |
| A14 = | −2.1837E+01 | −1.8683E+00 | −2.7881E+00 | 1.2183E−01 |
| A16 = | 1.1903E+01 | 1.4397E+00 | 9.2284E−01 | −1.5054E−02 |

In the image capturing lens system according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f [mm] | 2.34 | ΣCT/Td | 0.728 |
| Fno | 2.83 | (Sag22/CT2) × 10 | −0.253 |
| HFOV [deg.] | 32.9 | Sag21/CT2 | −0.222 |
| T12/CT2 | 0.799 | (R3 + R4)/(R3 − R4) | −0.07 |
| T23/CT2 | 0.615 | f1/f3 | 1.672 |
| T12/T23 | 1.301 | |f/f3| + |f/f4| | 2.630 |
| Td [mm] | 2.128 | | |

9th Embodiment

Figure 17:
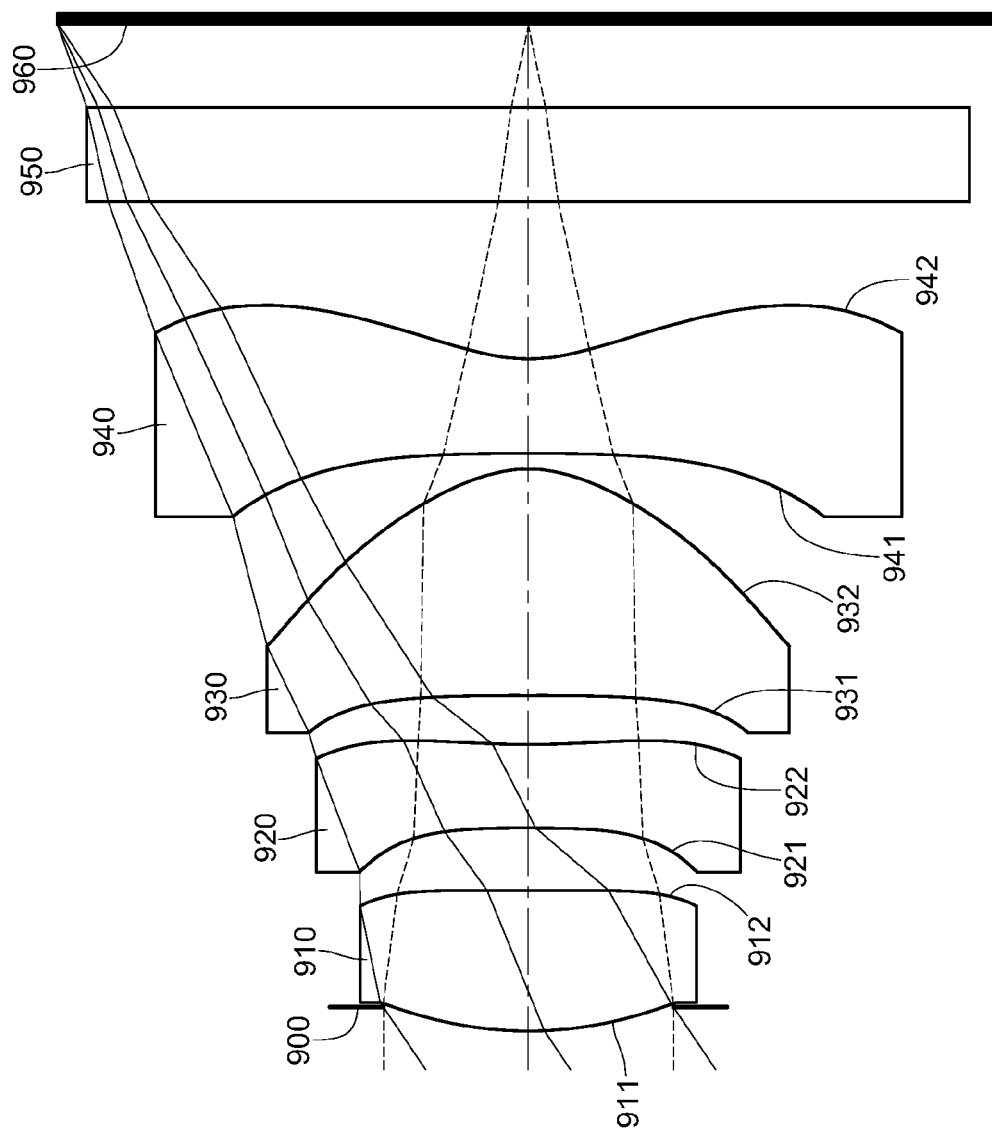
FIG. 17 is a schematic view of an image capturing lens system according to the 9th embodiment of the present disclosure.
Figure 18:
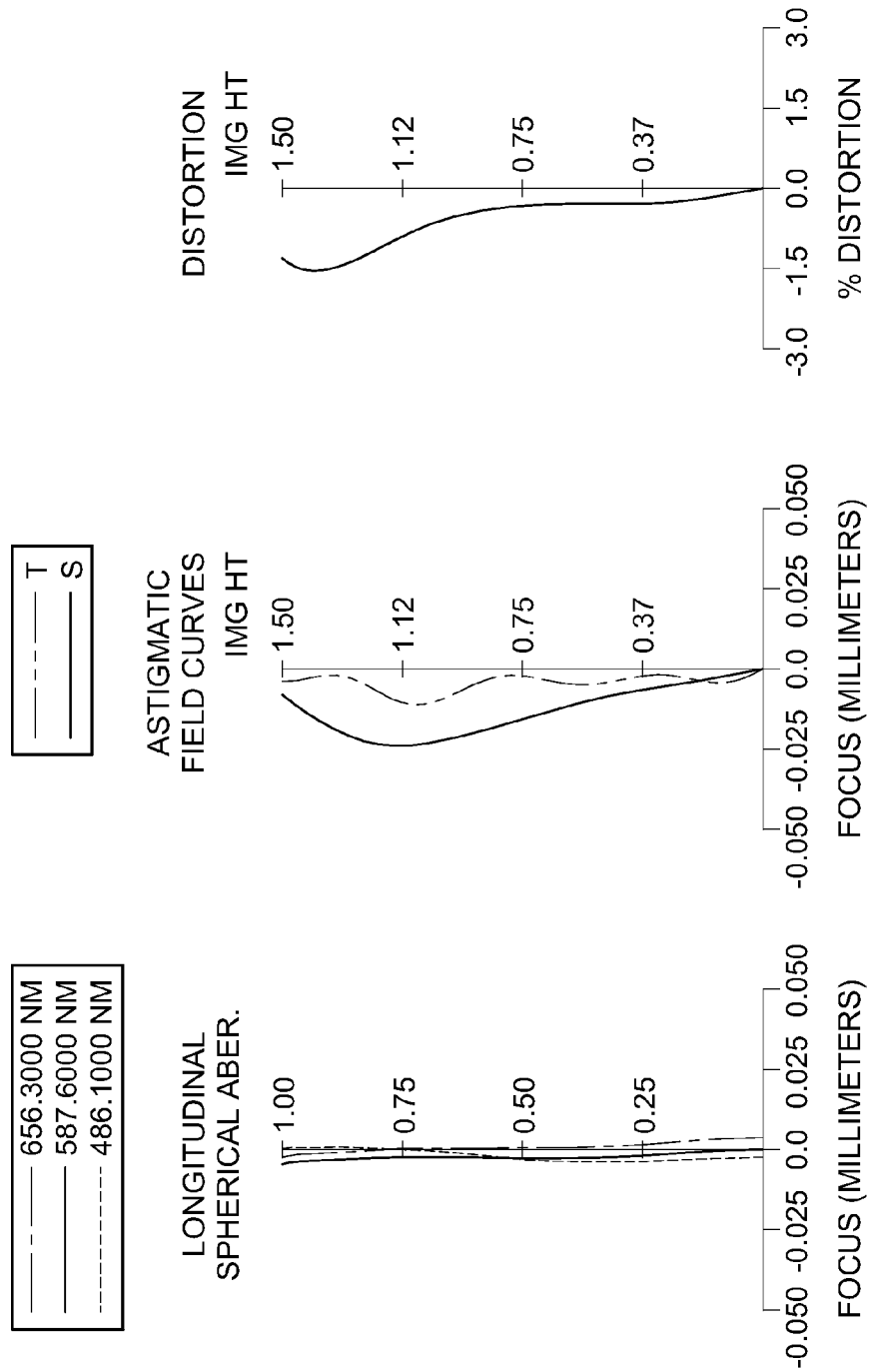
FIG. 18 shows spherical aberration curves, astigmatic field curves and a distortion curve of the image capturing lens system according to the 9th embodiment.

FIG. 17 is a schematic view of an image capturing lens system according to the 9th embodiment of the present disclosure. FIG. 18 shows spherical aberration curves, astigmatic field curves and a distortion curve of the image capturing lens system according to the 9th embodiment. In FIG. 17, the image capturing lens system includes, in order from an object side to an image side, an aperture stop 900, the first lens element 910, the second lens element 920, the third lens element 930, the fourth lens element 940, an IR-cut filter 950, and an image plane 960. There are four lens elements with refractive power.

The first lens element 910 with positive refractive power has a convex object-side surface 911 at a paraxial region and a concave image-side surface 912 at a paraxial region, and is made of plastic material. The object-side surface 911 and the image-side surface 912 of the first lens element 910 are aspheric.

The second lens element 920 with negative refractive power has a concave object-side surface 921 at a paraxial region and a concave image-side surface 922 at a paraxial region, wherein the image-side surface 922 of the second lens element 920 which is made of plastic material changes from concave at the paraxial region to convex at a peripheral region. The object-side surface 921 and the image-side surface 922 of the second lens element 920 are aspheric.

The third lens element 930 with positive refractive power has a concave object-side surface 931 at a paraxial region and a convex image-side surface 932 at a paraxial region, and is made of plastic material. The object-side surface 931 and the image-side surface 932 of the third lens element 930 are aspheric.

The fourth lens element 940 with negative refractive power has a concave object-side surface 941 at a paraxial region and a concave image-side surface 942 at a paraxial region, wherein the image-side surface 942 of the fourth lens element 940 which is made of plastic material changes from concave at the paraxial region to convex at a peripheral region. The object-side surface 941 and the image-side surface 942 of the fourth lens element 940 thereof are aspheric.

The IR-cut filter 950 is made of glass and located between the fourth lens element 940 and the image plane 960, and does not affect the focal length of the image capturing lens system.

The detailed optical data of the 9th embodiment are shown in Table 17, the aspheric surface data are shown in Table 18 below.

TABLE 17

9th Embodiment
f = 2.26 mm, Fno = 2.45, HFOV = 33.9 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.076 | | | | |
| 2 | Lens 1 | 1.215 | ASP | 0.447 | Plastic | 1.544 | 55.9 | 2.34 |
| 3 | | 22.550 | ASP | 0.199 | | | | |
| 4 | Lens 2 | −5.396 | ASP | 0.265 | Plastic | 1.650 | 21.4 | −2.73 |
| 5 | | 2.695 | ASP | 0.156 | | | | |
| 6 | Lens 3 | −14.203 | ASP | 0.720 | Plastic | 1.514 | 56.8 | 0.82 |
| 7 | | −0.418 | ASP | 0.050 | | | | |
| 8 | Lens 4 | −8.685 | ASP | 0.300 | Plastic | 1.535 | 55.7 | −0.90 |
| 9 | | 0.514 | ASP | 0.500 | | | | |
| 10 | IR-cut filter | Plano | | 0.300 | Glass | 1.517 | 64.2 | — |
| 11 | | Plano | | 0.263 | | | | |
| 12 | Image | Plano | | — | | | | |

Note:
Reference wavelength (d-line) is 587.6 nm.

TABLE 18

Aspheric Coefficients

| Surface # | 2 | 3 | 4 | 5 |
|---|---|---|---|---|
| k = | 1.7682E−01 | −5.5095E+01 | 7.5690E+01 | −6.8696E+01 |
| A4 = | −4.3640E−02 | −4.0836E−01 | −1.0727E+00 | −3.7065E−01 |
| A6 = | 2.0635E−02 | −1.3413E−02 | −1.9872E−01 | −2.7882E−01 |
| A8 = | −8.0816E−01 | −6.7669E+00 | −1.6579E+00 | −4.4323E−01 |
| A10 = | −1.8419E+00 | 2.6031E+01 | −8.2797E+00 | 2.8455E+00 |
| A12 = | 1.3761E+01 | −6.7077E+01 | 2.7189E+01 | −3.4740E+00 |
| A14 = | −4.5945E+01 | 5.6057E+01 | — | — |

| Surface # | 6 | 7 | 8 | 9 |
|---|---|---|---|---|
| k = | 8.8360E+01 | −3.2888E+00 | −1.0000E+00 | −6.8555E+00 |
| A4 = | −2.7825E−01 | −6.9629E−01 | −1.1120E−01 | −3.6180E−01 |
| A6 = | 2.0243E−01 | 1.1981E+00 | −5.2461E−01 | 5.1991E−01 |
| A8 = | −2.8063E−01 | −2.0295E+00 | 1.6958E+00 | −7.3732E−01 |
| A10 = | −8.2136E+00 | 1.3479E+00 | −3.2922E+00 | 6.9143E−01 |
| A12 = | 2.6340E+01 | 1.2208E+00 | 3.9537E+00 | −4.0778E−01 |
| A14 = | −2.9199E+01 | −3.0769E+00 | −2.7262E+00 | 1.3297E−01 |
| A16 = | 6.5501E+00 | 2.2628E+00 | 8.1259E−01 | −1.7651E−02 |

In the image capturing lens system according to the 9th embodiment, the definitions of these parameters shown in the following table are the same as those stated in the 1st embodiment with corresponding values for the 9th embodiment. Moreover, these parameters can be calculated from Tables 17 and Table 18 as the following values and satisfy the following relationships:

| | | | |
|---|---|---|---|
| f [mm] | 2.26 | ΣCT/Td | 0.810 |
| Fno | 2.45 | (Sag22/CT2) × 10 | −1.704 |
| HFOV [deg.] | 33.9 | Sag21/CT2 | −0.531 |
| T12/CT2 | 0.751 | (R3 + R4)/(R3 − R4) | 0.33 |
| T23/CT2 | 0.589 | f1/f3 | 2.846 |
| T12/T23 | 1.276 | |f/f3| + |f/f4| | 5.258 |
| Td [mm] | 2.137 | | |

It is to be noted that TABLES 1-18 show different data of the different embodiments; however, the data of the different embodiments are obtained from experiments. Therefore, any imaging lens system of the same structure is considered to be within the scope of the present disclosure even if it uses different data. The embodiments depicted above and the appended drawings are exemplary and are not intended to limit the scope of the present disclosure.

What is claimed is:

1. An image capturing lens system, in order from an object side to an image side comprising four lens elements with refractive power:

a first lens element with positive refractive power having a convex object-side surface at a paraxial region;

a second lens element with negative refractive power having a concave object-side surface at a paraxial region and a concave image-side surface at a paraxial region, wherein the image-side surface of the second lens element changes from concave at the paraxial region to convex at a peripheral region, and both the object-side surface and the image-side surface of the second lens element are aspheric;

a third lens element with positive refractive power having a concave object-side surface at a paraxial region and a convex image-side surface at a paraxial region; and a fourth lens element with negative refractive power having a concave image-side surface at a paraxial region, wherein the image-side surface of the fourth lens element changes from concave at the paraxial region to convex at a peripheral region, and both an object-side surface and the image-side surface of the fourth lens element are aspheric;

wherein a displacement in parallel with an optical axis from an axial vertex on the image-side surface of the second lens element to a maximum effective diameter position on the image-side surface of the second lens element is Sag22, a central thickness of the second lens element is CT2, an axial distance between the first lens element and the second lens element is T12, a focal length of the first lens element is f1, a focal length of the third lens element is f3, and the following relationships are satisfied:

$-5.0 < (Sag22/CT2) \times 10 < 0$;

$0.30 < T12/CT2 < 0.81$; and $1.65 < f1/f3 < 4.0$.

2. The image capturing lens system of claim 1, wherein a focal length of the image capturing lens system is f, the focal length of the third lens element is f3, a focal length of the fourth lens element is f4, and the following relationship is satisfied:

$2.5 < |f/f3| + |f/f4| < 7.5$.

3. The image capturing lens system of claim 2, wherein the focal length of the first lens element is f1, the focal length of the third lens element is f3, and the following relationship is satisfied:

1.75<f1/f3<3.2.

4. The image capturing lens system of claim 3, wherein the axial distance between the first lens element and the second lens element is T12, the central thickness of the second lens element is CT2, and the following relationship is satisfied:

0.40<T12/CT2<0.76.

5. The image capturing lens system of claim 3, wherein the displacement in parallel with the optical axis from the axial vertex on the image-side surface of the second lens element to the maximum effective diameter position on the image-side surface of the second lens element is Sag22, the central thickness of the second lens element is CT2, and the following relationship is satisfied:

−3.5<(Sag22/CT2)×10<−0.25.

6. The image capturing lens system of claim 5, wherein a sum of a central thickness of the first lens element, the central thickness of the second lens element, a central thickness of the third lens element and a central thickness of the fourth lens element is ΣCT, an axial distance between the object-side surface of the first lens element and the image-side surface of the fourth lens element is Td, and the following relationship is satisfied:

0.75<ΣCT/Td<0.90.

7. The image capturing lens system of claim 5, wherein the focal length of the image capturing lens system is f, the focal length of the third lens element is f3, the focal length of the fourth lens element is f4, and the following relationship is satisfied:

3.0<|f/f3|+|f/f4|<6.0.

8. The image capturing lens system of claim 2, wherein the object-side surface of the fourth lens element is concave at a paraxial region.

9. The image capturing lens system of claim 2, wherein a displacement in parallel with an optical axis from an axial vertex on the object-side surface of the second lens element to maximum effective diameter position on the object-side surface of the second lens element is Sag21, the central thickness of the second lens element is CT2, and the following relationship is satisfied:

−0.85<Sag21/CT2<−0.40.

10. The image capturing lens system of claim 2, wherein a curvature radius of the object-side surface of the second lens element is R3, a curvature radius of the image-side surface of the second lens element is R4, and the following relationship is satisfied:

−0.75<(R3+R4)/(R3−R4)<0.5.

11. The image capturing lens system of claim 10, wherein the axial distance between the first lens element and the second lens element is T12, an axial distance between the second lens element and the third lens element is T23, and the following relationship is satisfied:

0.9<T12/T23<2.5.

12. An image capturing lens system, in order from an object side to an image side comprising four lens elements with refractive power:

a first lens element with positive refractive power having a convex object-side surface at a paraxial region;

a second lens element with negative refractive power having a concave object-side surface at a paraxial region and a concave image-side surface at a paraxial region, wherein the image-side surface of the second lens element changes from concave at the paraxial region to convex at a peripheral region, and both the object-side surface and the image-side surface of the second lens element are aspheric;

a third lens element with positive refractive power having a concave object-side surface at a paraxial region and a convex image-side surface at a paraxial region; and a fourth lens element with negative refractive power having a concave image-side surface at a paraxial region, wherein the image-side surface of the fourth lens element changes from concave at the paraxial region to convex at a peripheral region, and both an object-side surface and the image-side surface of the fourth lens element are aspheric;

wherein a displacement in parallel with an optical axis from an axial vertex on the image-side surface of the second lens element to a maximum effective diameter position on the image-side surface of the second lens element is Sag22, a central thickness of the second lens element is CT2, an axial distance between the first lens element and the second lens element is T12, an axial distance between the second lens element and the third lens element is T23, and the following relationships are satisfied:

−5.0<(Sag22/CT2)×10<0;

0.30<T12/CT2<0.81; and 0.10<T23/CT2<0.90.

13. The image capturing lens system of claim 12, wherein the displacement in parallel with the optical axis from the axial vertex on the image-side surface of the second lens element to the maximum effective diameter position on the image-side surface of the second lens element is Sag22, the central thickness of the second lens element is CT2, and the following relationship is satisfied:

−3.5<(Sag22/CT2)×10<−0.25.

14. The image capturing lens system of claim 13, wherein the axial distance between the first lens element and the second lens element is T12, the axial distance between the second lens element and the third lens element is T23, and the following relationship is satisfied:

0.9<T12/T23<2.5.

15. The image capturing lens system of claim 13, wherein a curvature radius of the object-side surface of the second lens element is R3, a curvature radius of the image-side surface of the second lens element is R4, and the following relationship is satisfied:

−0.5<(R3+R4)/(R3−R4)<0.5.

16. The image capturing lens system of claim 12, wherein a sum of a central thickness of the first lens element, the central thickness of the second lens element, a central thickness of the third lens element and a central thickness of the fourth lens element is ΣCT, an axial distance between the object-side surface of the first lens element and the image-side surface of the fourth lens element is Td, and the following relationship is satisfied:

$$0.75 < \Sigma CT/Td < 0.95.$$

17. The image capturing lens system of claim 16, wherein a focal length of the image capturing lens system is f, a focal length of the third lens element is f3, a focal length of the fourth lens element is f4, and the following relationship is satisfied:

$$3.0 < |f/f3| + |f/f4| < 6.0.$$

18. The image capturing lens system of claim 16, wherein a displacement in parallel with an optical axis from an axial vertex on the object-side surface of the second lens element to a maximum effective diameter position on the object-side surface of the second lens element is Sag21, the central thickness of the second lens element is CT2, and the following relationship is satisfied:

$$-0.85 < Sag21/CT2 < -0.40.$$

19. The image capturing lens system of claim 16, wherein the axial distance between the object-side surface of the first lens element and the image-side surface of the fourth lens element is Td, and the following relationship is satisfied:

$$1.0 \text{ mm} < Td < 2.35 \text{ mm}.$$

* * * * *